United States Patent
He et al.

(10) Patent No.: US 10,592,519 B2
(45) Date of Patent: Mar. 17, 2020

(54) COMPUTATIONAL-MODEL OPERATION USING MULTIPLE SUBJECT REPRESENTATIONS

(71) Applicant: Microsoft Technology Licensing, LLC, Redmond, WA (US)

(72) Inventors: Xiaodong He, Sammamish, WA (US); Li Deng, Redmond, WA (US); Jianfeng Gao, Woodinville, WA (US); Wen-tau Yih, Redmond, WA (US); Moontae Lee, Ithaca, NY (US); Paul Smolensky, Timonium, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 535 days.

(21) Appl. No.: 15/084,366

(22) Filed: Mar. 29, 2016

(65) Prior Publication Data
US 2017/0286494 A1   Oct. 5, 2017

(51) Int. Cl.
G06F 16/2458   (2019.01)
G06F 16/2453   (2019.01)

(52) U.S. Cl.
CPC .... *G06F 16/2462* (2019.01); *G06F 16/24537* (2019.01)

(58) Field of Classification Search
CPC ........... G06F 17/2785; G06F 17/30684; G06F 17/30536; G06F 16/2462; G06F 16/24537
(Continued)

(56) References Cited

U.S. PATENT DOCUMENTS 5,696,962 A   12/1997   Kupiec
9,292,262 B2 *  3/2016   Gabel ................... G06Q 30/02
(Continued)

FOREIGN PATENT DOCUMENTS

CN   102609500   7/2012

OTHER PUBLICATIONS

Bengio, et al., "A Neural Probabilistic Language Model," Journal of Machine Learning Research, vol. 3, Mar. 2003, pp. 1137-1155.
(Continued)

*Primary Examiner* — Phong H Nguyen
(74) *Attorney, Agent, or Firm* — Schwegman Lundberg & Woessner, P.A.

(57) ABSTRACT

A processing unit can determine multiple representations associated with a statement, e.g., subject or predicate representations. In some examples, the representations can lack representation of semantics of the statement. The computing device can determine a computational model of the statement based at least in part on the representations. The computing device can receive a query, e.g., via a communications interface. The computing device can determine at least one query representation, e.g., a subject, predicate, or entity representation. The computing device can then operate the model using the query representation to provide a model output. The model output can represent a relationship between the query representations and information in the model. The computing device can, e.g., transmit an indication of the model output via the communications interface. The computing device can determine mathematical relationships between subject representations and attribute representations for multiple statements, and determine the model using the relationships.

20 Claims, 13 Drawing Sheets

(58) Field of Classification Search
USPC .................................................. 707/708, 713
See application file for complete search history.

(56) References Cited

U.S. PATENT DOCUMENTS

| | | | | |
|---|---|---|---|---|
| 10,289,717 | B2* | 5/2019 | Lee | G06F 16/24522 |
| 2002/0107844 | A1* | 8/2002 | Cha | G06F 16/3344 707/999.003 |
| 2006/0041424 | A1 | 2/2006 | Todhunter et al. | |
| 2007/0168932 | A1* | 7/2007 | Seeger | G06F 8/10 717/105 |
| 2007/0239643 | A1* | 10/2007 | Liu | G06F 16/35 706/29 |
| 2013/0212052 | A1* | 8/2013 | Yu | G06N 3/04 706/25 |
| 2014/0122586 | A1* | 5/2014 | Kao | G06Q 50/01 709/204 |
| 2014/0249799 | A1* | 9/2014 | Yih | G06F 17/277 704/9 |
| 2014/0328379 | A1* | 11/2014 | Krishnamoorthy | H04L 25/0212 375/224 |
| 2015/0026106 | A1 | 1/2015 | Oh et al. | |
| 2015/0095017 | A1* | 4/2015 | Mnih | G06N 3/0454 704/9 |
| 2015/0100943 | A1* | 4/2015 | Gabel | G06Q 30/02 717/106 |
| 2015/0379571 | A1* | 12/2015 | Grbovic | G06Q 30/0256 705/14.54 |
| 2016/0162466 | A1* | 6/2016 | Munro | G06F 17/277 704/9 |
| 2016/0275196 | A1* | 9/2016 | Lee | G06F 16/3338 |
| 2017/0075953 | A1* | 3/2017 | Bozkaya | G06F 17/2775 |
| 2017/0206191 | A1* | 7/2017 | Biegert | G06F 17/241 |
| 2017/0228433 | A1* | 8/2017 | Gartrell | G06F 16/24575 |

OTHER PUBLICATIONS

Berant, et al., "Semantic Parsing on Freebase from Question-Answer Pair," Proceedings of the Conference on Empirical Methods in Natural Language Processing, Oct. 18, 2013, pp. 1533-1544.
Bordes, et al., "Question Answering with Subgraph Embeddings," Proceedings of the Conference on Empirical Methods in Natural Language Processing, Oct. 25, 2014, pp. 615-620.
Dupoux, "Deconstructing AI-Complete Question-Answering: Going Beyond Toy Tasks," Published on Apr. 29, 2015, Available at: http://bootphon.blogspot.in/2015/04/deconstructing-ai-complete-question.html.
Grefenstette, E., "Towards a Formal Distributional Semantics: Simulating Logical Calculi with Tensors," Proceedings of the Second Joint Conference on Lexical and Computational Semantics, Jun. 13, 2013, pp. 1-10.
Jones, et al., "Representing Word Meaning and Order Information in a Composite Holographic Lexicon," Journal Psychological Review, vol. 114, No. 1, Jan. 2007, pp. 1-37.
Kumar, et al., "Ask Me Anything: Dynamic Memory Networks for Natural Language Processing," Journal of Computing Research Repository, Jun. 2015, pp. 1-10.
Lee, et al., "Reasoning in Vector Space: An Exploratory Study of Question Answering," Journal of Computing Research Repository, Nov. 2015, pp. 1-11.
Linda, et al., "Using Vector Space Model in Question Answering System," Proceedings of International Conference on Computer Science and Computational Intelligence, vol. 59, Aug. 24, 2015, pp. 305-311.
Mikolov, et al., "Distributed Representations of Words and Phrases and Their Compositionality," Journal of Computing Research Repository, Oct. 2013, pp. 1-9.
Pennington, et al., "GloVe: Global Vectors for Word Representation," Proceedings of the Conference on Empirical Methods in Natural Language Processing, Oct. 25, 2014, pp. 1532-1543.
Rocktaschel, et al., "Low-Dimensional Embeddings of Logic," Proceedings of ACL Workshop on Semantic Parsing, Jun. 26, 2014, 5 pages.
Smolensky, P., "Tensor Product Variable Binding and the Representation of Symbolic Structures in Connectionist Systems," Journal Artificial Intelligence, vol. 46, Issue 1-2, Nov. 11, 1990, pp. 159-216.
Sukhbaatar, et al., "End-To-End Memory Networks," Advances in Neural Information Processing Systems, Dec. 1, 2015, pp. 1-11.
Ustun, et al., "Distributed Vector Representations of Words in the Sigma Cognitive Architecture," Proceedings of 7th International Conference on Artificial Intelligence, Aug. 1, 2014, 12 pages.
Weston, et al., "Memory Networks," Proceedings of International Conference on Learning Representations, May 7, 2015, pp. 1-15.
Weston, et al., "Towards AI-Complete Question Answering: A Set of Prerequisite Toy Tasks," Proceedings of CORR, Feb. 2015, pp. 1-14.
Yih, et al., "Semantic Parsing via Staged Query Graph Generation: Question Answering with Knowledge Base," Proceedings of the Joint Conference of the 53rd Annual Meeting of the ACL and the 7th International Joint Conference on Natural Language Processing of the AFNLP, Jul. 28, 2015, 12 pages.

* cited by examiner

COMPUTATIONAL-MODEL OPERATION USING MULTIPLE SUBJECT REPRESENTATIONS

BACKGROUND

Users increasingly turn to computing services, such as Web search engines, for information or for answers to specific questions. However, many such computing systems are designed for representing documents or document locations and are limited in their ability to represent individual pieces of information. As a result, users frequently cannot find answers solely through the computing service, but must read one or more documents to find answers. This can increase the amount of time and network bandwidth required for a user to find an answer to a query.

SUMMARY

This disclosure describes systems, methods, and computer-readable media for determining computational models (CMs), such as tensor-product representation (TPR), equation-system (ES), and graph models, and for using the computational models in, e.g., determining responses to queries made during a session, e.g., a communication session with an entity. In some examples, a computing device can determine a first-subject representation associated with a first subject of a statement. The computing device can determine a predicate representation associated with a predicate of the statement and can determine a second-subject representation associated with a second subject of the statement. The computing device can determine a computational model of the statement based at least in part on the first-subject representation, the predicate representation, and the second-subject representation. The computing device can determine, based at least in part on a query, two query representations comprising at least two of a first query-subject representation, a second query-subject representation, and a query-predicate representation. The computing device can then operate the computational model using the two query representations to provide a model output corresponding to the query. The model output can represent a relationship between the two query representations and at least some information in the computational model. According to example techniques herein, the computing device can determine a first-subject representation associated with a first subject of a statement and a second-subject representation associated with a second subject of the statement. The computing device can determine a computational model of the statement based at least in part on the first-subject representation and the second-subject representation. The computing device can receive a query via a communications interface, determine an entity representation based at least in part on the query, operate the computational model using the entity representation to provide a model output corresponding to the query, and transmit an indication of the model output via the communications interface.

This Summary is provided to introduce a selection of concepts in a simplified form that are further described below in the Detailed Description. This Summary is not intended to identify key and/or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar and/or identical items.

DETAILED DESCRIPTION

Overview

Figure 1:
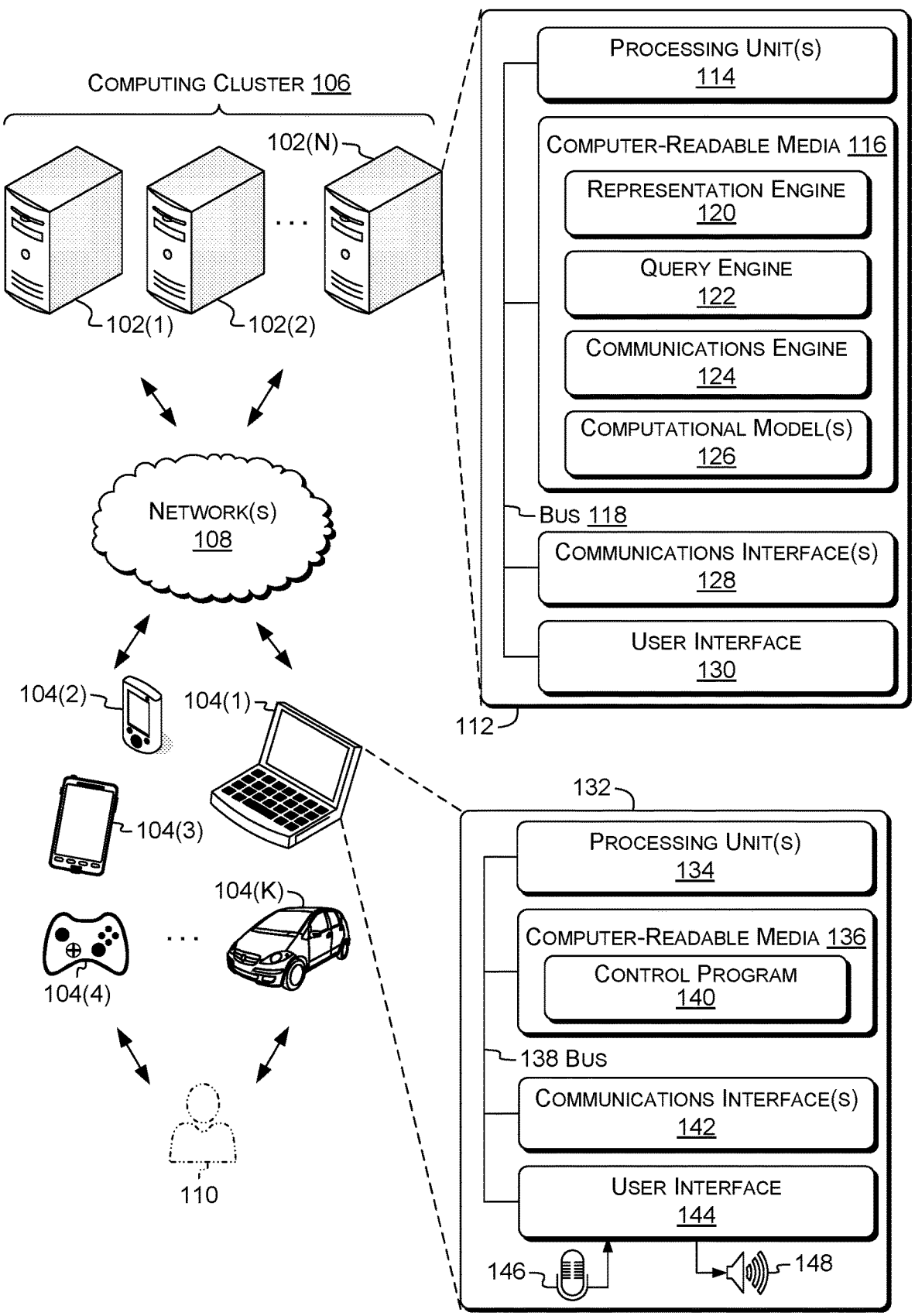
FIG. 1 is a block diagram depicting example scenarios for determining and operating computational models as described herein.

Examples described herein provide techniques and constructs to improve the determination and operation of computational models (CMs), e.g., tensor-product representation (TPR), equation-system (ES), and graph models. Examples described herein provide techniques and constructs to permit a computing system to more effectively provide relevant information in response to queries. For example, a user may submit a factual query, e.g., "who was the president after Washington?" Examples herein permit determining and querying a knowledge base for the corresponding answer, "John Adams." In another example, a user may submit a query related to a query earlier in a session. Examples herein operate over the course of multiple interactions with a user to adapt the system to the context of user queries, increasing the ability of the system to provide results relevant to the user. For example, in a session, a user may submit the query "how do I get to Carnegie Hall?" followed by a subsequent query "can I get a cab?" Examples herein can permit determining that the reference to a "cab" refers to transportation to "Carnegie Hall." Examples herein can reduce the number of system interactions required by the user to achieve the user's goals, thus reducing the bandwidth required for communication between the system and the user. Examples herein are given in the English language, but this is not limiting. Example techniques herein can be adapted to other natural or constructed languages.

Some examples use CMs to determine an action to be taken based on state information of a session of user interaction with the system. Example actions can include transmitting specific information to the user. Accordingly, some examples herein permit determining actions of a computing system, e.g., results to be presented to a user, based on both short- and long-term contributions to assisting the user, rather than merely based on textual understanding of a single user query. Using CMs according to some examples herein permits tracking state over a period of time, rather than only a most-recent observation of the user. Moreover, using CMs to represent state information can permit understanding order-sensitive user inputs or other order-sensitive portions of the state, e.g., the sequence of U.S. Presidents.

For brevity, some examples herein are described with reference to the context of a Web search service, e.g., BING, GOOGLE, etc. However, these examples are not limiting. Other contexts in which examples herein can be applied can include question-answering services; voice-based assistants, such as CORTANA, SIRI, GOOGLE NOW, etc.; dialog-based personal assistant software, e.g., interacting with a user via a text interface; software agents executing on computing devices such as desktops or smartphones; artificial intelligence for, e.g., non-player characters presented and automatically controlled in a gaming-style user interface; navigation or other informational kiosks, e.g., in museums; customer-service terminals such as airline check-in terminals at airports; or instant-messaging services.

Some examples represent state information in a computational model (CM) in a way that does not require training such as the training commonly used in learning-based neural networks. For example, in a TPR representation, an item of state information can be represented using a tensor product of mathematical representations of one or more subjects or attributes related to the item of state information. This can permit storing state information more rapidly than in learning-based neural-network models, and with reduced usage of processing power and memory. Moreover, in some examples, new state information added to the computational model is immediately accessible, whereas in a neural-network system a training process can be required to incorporate new information into a neural-network model. Accordingly, some examples herein provide more rapid access to state information, and reduced latency of processing state information.

Various entities, configurations of electronic devices, and methods for determining and operating computational models, e.g., for user-service applications, are described further with reference to FIGS. 1-13. While many examples described herein relate to servers and other non-consumer electronic devices, other types of electronic devices can be used, e.g., as discussed with reference to FIG. 1. References throughout this document to "users" can refer to human users or to other entities interacting with a computing system.

Illustrative Environment

FIG. 1 shows an example scenario 100 in which examples of computational-model-based systems can operate and/or in which computational-model determination and/or use methods such as those described herein can be performed. In the illustrated example, the various devices and/or components illustrated in scenario 100 include computing device(s) 102(1)-102(N) (individually and/or collectively referred to herein with reference 102), where N is any integer greater than and/or equal to 1, and computing devices 104(1)-104(K) (individually and/or collectively referred to herein with reference 104), where K is any integer greater than and/or equal to 1. In some examples, N=K; in other examples, N>K or N<K. Although illustrated as, e.g., desktop computers, laptop computers, tablet computers, and/or cellular phones, computing device(s) 102 and/or 104 can include a diverse variety of device categories, classes, and/or types and are not limited to a particular type of device.

In the illustrated example, computing device(s) 102(1)-102(N) can be computing nodes in a cluster computing system 106, e.g., a cloud service such as MICROSOFT AZURE, GOOGLE CLOUD PLATFORM, or another cluster computing system ("computing cluster" or "cluster") having several discrete computing nodes (device(s) 102) that work together to accomplish a computing task assigned to the cluster as a whole. In some examples, computing device(s) 104 can be clients of cluster 106 and can submit jobs to cluster 106 and/or receive job results from cluster 106. Computing devices 102(1)-102(N) in cluster 106 can, e.g., share resources, balance load, increase performance, and/or provide fail-over support and/or redundancy. Computing devices 104 can additionally or alternatively operate in a cluster and/or grouped configuration. In the illustrated example, computing devices 104 communicate with computing devices 102. Additionally or alternatively, computing devices 104 can communicate with cluster 106, e.g., with a load-balancing or job-coordination device of cluster 106, and cluster 106 or components thereof can route transmissions to individual computing devices 102.

Some cluster-based systems can have all or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc.

By way of example and not limitation, computing device(s) 102 and/or 104 can include, but are not limited to, server computers and/or blade servers such as Web servers, map/reduce servers and/or other computation engines, and/or network-attached-storage units (e.g., 102(1)), laptop computers, thin clients, terminals, and/or other mobile computers (e.g., 104(1)), wearable computers such as smart watches and/or biometric and/or medical sensors, implanted computing devices such as biometric and/or medical sensors, computer navigation client computing devices, satellite-based navigation system devices including global positioning system (GPS) devices and/or other satellite-based navigation system devices, personal data assistants (PDAs), and/or other specialized portable electronic devices (e.g., 104(2)), tablet computers, tablet hybrid computers, smartphones, mobile phones, mobile phone-tablet hybrid devices, and/or other telecommunication devices (e.g., 104(3)), portable and/or console-based gaming devices and/or other entertainment devices such as network-enabled televisions, set-top boxes, media players, cameras, and/or personal video recorders (PVRs) (e.g., 104(4), represented graphically as a gamepad), automotive computers such as vehicle control systems, vehicle security systems, and/or electronic keys for vehicles (e.g., 104(K), represented graphically as an automobile), desktop computers, and/or integrated components for inclusion in computing devices, appliances, and/or other computing device(s) configured to participate in and/or carry out computational-model determination and/or operation as described herein, e.g., for control purposes. In some examples, as indicated, computing device(s), e.g., computing devices 102(1) and 104(1), can intercommunicate to participate in and/or carry out computational-model determination and/or operation as described herein. For example, computing device 104(K) can be or include a data source operated by a user and computing device 102(1) can be a computational-model determination and operation system, as described below with reference to, e.g., FIGS. 2-13.

Different devices and/or types of computing devices 102 and 104 can have different needs and/or ways of interacting with cluster 106. For example, computing devices 104 can interact with cluster 106 with discrete request/response communications, e.g., for queries and responses using an already-determined computational model. Additionally and/or alternatively, computing devices 104 can be data sources and can interact with cluster 106 with discrete and/or ongoing transmissions of data to be used as input to a computational model or a process of determining a computational model. For example, a data source in an automobile, e.g., a computing device 104(K) associated with an interactive voice-response system in the automobile, can provide to cluster 106 data of location and environmental conditions around the car. This can provide improved accuracy of outputs of a CM by increasing the amount of state data input to the CM. Additionally and/or alternatively, computing devices 104 can be data sinks and can interact with cluster 106 with discrete and/or ongoing requests for data output from a computational model, e.g., updates to driving directions based on changing traffic conditions.

In some examples, computing devices 102 and/or 104 can communicate with each other and/or with other computing devices via one or more network(s) 108. In some examples, computing devices 102 and 104 can communicate with external devices via network(s) 108. For example, network(s) 108 can include public networks such as the Internet, private networks such as an institutional and/or personal intranet, and/or combination(s) of private and public networks. Private networks can include isolated networks not connected with other networks, such as MODBUS, FIELDBUS, and/or Industrial Ethernet networks used internally to factories for machine automation. Private networks can also include networks connected to the Internet and/or other public network(s) via network address translation (NAT) devices, firewalls, network intrusion detection systems, and/or other devices that restrict and/or control the types of network packets permitted to flow between the private network and the public network(s).

Network(s) 108 can also include any type of wired and/or wireless network, including but not limited to local area networks (LANs), wide area networks (WANs), satellite networks, cable networks, Wi-Fi networks, WiMAX networks, mobile communications networks (e.g., 3G, 4G, and so forth) and/or any combination thereof. Network(s) 108 can utilize communications protocols, such as, for example, packet-based and/or datagram-based protocols such as Internet Protocol (IP), Transmission Control Protocol (TCP), User Datagram Protocol (UDP), other types of protocols, and/or combinations thereof. Moreover, network(s) 108 can also include a number of devices that facilitate network communications and/or form a hardware infrastructure for the networks, such as switches, routers, gateways, access points, firewalls, base stations, repeaters, backbone devices, and the like. Network(s) 108 can also include devices that facilitate communications between computing devices 102 and/or 104 using bus protocols of various topologies, e.g., crossbar switches, INFINIBAND switches, and/or FIBRE CHANNEL switches and/or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, and/or WiMAX.

Different networks have different characteristics, e.g., bandwidth or latency, and for wireless networks, accessibility (open, announced but secured, and/or not announced), and/or coverage area. The type of network 108 used for any given connection between, e.g., a computing device 104 and cluster 106 can be selected based on these characteristics and on the type of interaction. An example data source can be a real-time data and/or video stream from a drone and/or other remotely-operated vehicle or from a webcam. Such a video stream can be carried via high-bandwidth, low-latency networks. By contrast, low-bandwidth networks can be used to carry textual queries from users, responses to users, or data such as measurements from environmental sensors such as temperature sensors. Such sensors can provide infrequent updates, e.g., one value per minute of a gradually changing temperature.

In some examples, computing devices 102 and/or 104, e.g., laptops, smartphones, and/or other computing devices 102 and/or 104 described above, interact with an entity 110. The entity 110 can include systems, devices, parties such as users, and/or other features with which computing devices 102 and/or 104 can interact. For brevity, examples of entity 110 are discussed herein with reference to users of a computing system; however, these examples are not limiting. In some examples, computing device 104 is operated by entity 110, e.g., a user. In some examples, computing devices 102 operate computational models to determine a model output corresponding to a user query, and transmit an output of the model output via network 108 to computing device 104(3), e.g., a smartphone. Computing device 104(3) can, e.g., present information of the model output to entity 110. Examples of this process are discussed in more detail below with reference to FIGS. 3-13.

Still referring to the example of FIG. 1, details of an example computing device 102(N) are illustrated at inset 112. The details of example computing device 102(N) can be representative of others of computing device(s) 102. However, each of the computing device(s) 102 can include additional or alternative hardware and/or software components. The illustrated computing device 102(N) can include one or more processing unit(s) 114 operably connected to one or more computer-readable media 116, e.g., memories, such as via a bus 118, which in some instances can include one or more of a system bus, a data bus, an address bus, a Peripheral Component Interconnect (PCI) Express (PCIe) bus, a PCI bus, a Mini-PCI bus, and any variety of local, peripheral, and/or independent buses, and/or any combination thereof. In some examples, plural processing units 114 can exchange data through an internal interface bus (e.g., PCIe), rather than and/or in addition to network 108. While the processing units 114 are described as residing on the computing device 102(N), in this example, the processing units 114 can also reside on different computing device(s) 102 and/or 104 in some examples. In some examples, at least two of the processing units 114 can reside on different computing device(s) 102 and/or 104. In such examples, multiple processing units 114 on the same computing device 102 and/or 104 can use a bus 118 of the computing device 102 and/or 104 to exchange data, while processing units 114 on different computing device(s) 102 and/or 104 can exchange data via network(s) 108.

Computer-readable media described herein, e.g., computer-readable media 116, includes computer storage media and/or communication media. Computer storage media includes tangible storage units such as volatile memory, nonvolatile memory, and/or other persistent and/or auxiliary computer storage media, removable and non-removable computer storage media implemented in any method and/or technology for storage of information such as computer-readable instructions, data structures, program modules, and/or other data. Computer storage media includes tangible and/or physical forms of media included in a device and/or hardware component that is part of a device and/or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards and/or other optical storage media, magnetic cassettes, magnetic tape, magnetic disk storage, magnetic cards and/or other magnetic storage devices and/or media, solid-state memory devices, storage arrays, network attached storage, storage area networks, hosted computer storage and/or memories, storage, devices, and/or storage media that can be used to store and maintain information for access by a computing device 102 and/or 104.

In contrast to computer storage media, communication media can embody computer-readable instructions, data structures, program modules, and/or other data in a modulated data signal, such as a carrier wave, and/or other transmission mechanism. As defined herein, computer storage media does not include communication media.

In some examples, computer-readable media 116 can store instructions executable by the processing unit(s) 114. Computer-readable media 116 can store, for example, computer-executable instructions of an operating system (omitted for brevity), module(s) of a representation engine 120, module(s) of a query engine 122, module(s) of a communications engine 124, and/or other modules, programs, and/or applications that are loadable and executable by processing unit(s) 114. For example, the computer-executable instructions stored on the computer-readable media 116 can upon execution configure a computer such as a computing device 102 and/or 104 to perform operations described herein with reference to the operating system, the representation engine 120, the query engine 122, and/or the communications engine 124.

In some examples not shown, one or more of the processing unit(s) 114 in one of the computing device(s) 102 and/or 104 can be operably connected to computer-readable media 116 in a different one of the computing device(s) 102 and/or 104, e.g., via communications interface 128 (discussed below) and network 108. For example, program code to perform steps of flow diagrams herein, e.g., as described herein with reference to representation engine 120 or query engine 122, can be downloaded from a server, e.g., computing device 102(1), to a client, e.g., computing device 104(K), e.g., via the network 108, and executed by one or more processing unit(s) in computing device 104(K).

Computer-readable media 116 can also store one or more computational model(s) (CMs) 126, individually and/or collectively referred to herein with reference 126. In some examples, algorithms for determining or operating computational model(s) 126 as described herein can be performed on a computing device (e.g., computing device 102), such as a smart phone, a tablet, a desktop computer, a server, a server blade, a supercomputer, etc. The resulting models can be used on such computing devices and/or on computing devices (e.g., computing device 104) having one or more input devices, such as a physical keyboard, a soft keyboard, a touch screen, a touch pad, microphone(s), and/or camera(s). In some examples, functions described herein can be shared between one or more computing device(s) 102 and one or more computing device(s) 104. For example, the computing device(s) 104 can perform incremental updating of a computational model and the computing device(s) 102 can perform repacking of the CMs 126, e.g., as described below with reference to FIG. 13.

In various examples, e.g., of computational models for responding to user queries and/or other use cases noted herein, the computational models may include, but are not limited to, tensors, e.g., multidimensional matrices; systems of equations; or graph-structured linked representations. The computational models 126 can include, but are not limited to, e.g., tensor cell values, graph-edge weights, or equation coefficients, or other data values (collectively "parameters"). The representation engine 120 can be configured to determine CMs 126, e.g., to determine values of parameters in computational models 126. For example, representation engine 120 can determine CMs 126 using an iterative update rule.

The query engine 122 can be configured to use the determined parameter values of computational model 126 to, e.g., determine a response to a user query, and/or to perform other data analysis and/or processing. The communications engine 124 can communicate information, e.g., between entity 110 and computational models 126 designed for processing or responding to user queries.

Computing device 102 can also include one or more communications interface(s) 128 connected via the bus 118 to processing units 114 to enable wired and/or wireless communications between computing device(s) 102 and other networked computing devices 102 and/or 104 involved in cluster computing, and/or other computing device(s), e.g., over network(s) 108. The processing units 114 can exchange data through respective communications interface(s) 128, which can transmit and receive data via bus 118 or network 108. In some examples, the communications interface 128 can include, but is not limited to, a transceiver for cellular (3G, 4G, and/or other), WI-FI, Ultra-wideband (UWB), BLUETOOTH, and/or satellite transmissions. The communications interface 128 can include a wired I/O interface, such as an Ethernet interface, a serial interface, a Universal Serial Bus (USB) interface, an INFINIBAND interface, and/or other wired interfaces. The communications interface 128 can additionally and/or alternatively include at least one user-interface device or user interface, at least one bus such as a memory bus and/or local bus, at least one memory interface, and/or at least one hardwired interface such as a 0-20 mA control line. For simplicity, these and other components are omitted from the illustrated computing device 102(N) and from inset 112.

In some examples, computing device 102 can include a user interface 130 configured to permit a user, e.g., entity 110 and/or a CM administrator, to operate the representation engine 120, the query engine 122, and/or the communications engine 124. Some examples of user interface 130 are discussed below.

Details of an example computing device 104(1) are illustrated at inset 132. The details of example computing device 104(1) can be representative of others of computing device(s) 104. However, each of the computing device(s) 104 can include additional and/or alternative hardware and/or software components. Computing device 104(1) can include one or more processing unit(s) 134 operably connected to one or more computer-readable media 136, e.g., via a bus 138. Some examples of processing unit(s) 134 are discussed above with reference to processing unit(s) 114. Some examples of computer-readable media 136 are discussed above with reference to computer-readable media 116. For example, computer-readable media 136 can include one or more computer storage media. Some examples of bus 138 are discussed above with reference to bus 118.

Computer-readable media 136 can store, for example, computer-executable instructions of an operating system (omitted for brevity), a communications engine (omitted for brevity), a control program 140 and/or module(s) thereof, and/or other modules, programs, and/or applications that are loadable and executable by processing unit(s) 136.

In some examples, the control program 140 can be configured to receive inputs, e.g., via a keyboard, transmit corresponding queries to a computing device 102, receive responses from computing device 102, and present the responses, e.g., via a display. In some examples, determination and operation of computational models are carried out on computing device(s) 102. In some examples, determination and operation are carried out on a computing device 104. In some of these examples, the control program 140 can be configured to receive inputs, determine and/or operate computational model(s) 126 using instructions of representation engine 120 and query engine 122 based at least in part on those inputs, e.g., to determine a model output. In some examples, the control program 140 can include, but is not limited to, a Web browser, smartphone app or desktop application, background service conducting or monitoring network communications, or instant-messaging client, or can include components of any of those configured to perform functions described herein. For clarity herein, various examples are discussed with reference to a Web browser. Other types of control programs 140 can be used with those examples except as expressly indicated.

In some examples, the computing device 104 can be configured to communicate with computing device(s) 102 to operate a computational model 126. For example, the computing device 104 can transmit a request to computing device(s) 102 for an output of the computational model(s) 126, receive a response, and take action based on that response. For example, the computing device 104 can provide to entity 110 information included in the response.

Computing device 104 can also include one or more communications interfaces 142 connected via the bus 138 to processing unit(s) 134 to enable wired and/or wireless communications between computing device(s) 104 and other networked computing devices 102 and/or 104 involved in cluster computing, and/or other computing device(s), over network(s) 108. Some examples are discussed above with reference to communications interface 128.

In some examples, computing device 104 can include a user interface 144. For example, computing device 104(N) can provide user interface 144 to control and/or otherwise interact with cluster 106 and/or computing devices 102 therein. For example, processing unit(s) 134 can receive inputs of user actions via user interface 144 and transmit corresponding data via communications interface 142 to computing device(s) 102.

User interface 130 and/or 144 can include one or more input devices, integral and/or peripheral to computing device 102 and/or 104. The input devices can be user-operable, and/or can be configured for input from other computing device 102 and/or 104. Examples of input devices can include, e.g., a keyboard, keypad, a mouse, a trackball, a pen sensor and/or smart pen, a light pen and/or light gun, a game controller such as a joystick and/or game pad, a voice input device such as a microphone, voice-recognition device, and/or speech-recognition device, a touch input device such as a touchscreen, a gestural and/or motion input device such as a depth camera, a grip sensor, an accelerometer, another haptic input, a visual input device such as one or more cameras and/or image sensors, and the like. User queries can be received, e.g., from entity 110, via user interface 130 and/or user interface 144. In some examples, user interface 130 and/or user interface 144 can include a microphone 146 or other audio-input device, and computing device 104 can execute a speech-recognition engine (omitted for brevity) to determine, e.g., textual data of queries from input audio detected by microphone 146.

User interfaces 130 and/or 144 can include one or more output devices configured for communication to a user and/or to another computing device 102 and/or 104. Output devices can be integral and/or peripheral to computing device 102 and/or 104. Examples of output devices can include a display, a printer, audio speakers, beepers, and/or other audio output devices, a vibration motor, linear vibrator, and/or other haptic output device, and the like. Actions, e.g., presenting information of or corresponding to an output of a CM 126 to entity 110, can be taken via user interface 130 and/or user interface 144. In some examples, user interface 130 and/or user interface 144 can include a speaker 148 or other audio-output device, and computing device 104 can execute a speech-synthesis engine (omitted for brevity) to determine, e.g., audio data of actions from text or other data of those actions, e.g., received via network 108. Although shown as part of computing device 104, microphone 146 and speaker 148 can be separate from computing device 104 and communicatively connectable therewith.

In some examples, computing device 104 permits entity 110 to carry out multiple interactions with computing device 102 over the course of a session. A session can include, e.g., communications or interactions during a persistent network connection such as a Telnet connection, or a series of user interactions with a particular Web server or portal (e.g., across one or more HTTP connections). A session can be represented by or conducted with a server such as computing device 102. Computing devices 102 or 104 can store or exchange session data; exchanges can be carried out, e.g., via HTTP or other protocols. Session data can include, but is not limited to, at least one of: textual data of the session, e.g., a query or queries provided by entity 110 (including, but not limited to, text produced by a speech-recognition engine); text or timestamps of instant messages, text messages, social-network postings, or other communications transmitted to or from entity 110; identification information of a user or other entity 110, historical information of the session, e.g., prior queries, responses, or actions taken; content created by, sent to, or otherwise related to, entity 110; image data; audio data; numerical data such as number of queries in the session; user profile information such as name, location, interests, or the like; information about connections between entity 110 and other entities, e.g., other users; or date/time data such as start time of the session, historical times and dates of sessions by the same user, or a time zone or local time of entity 110. As used herein, a user profile can be associated with a particular entity 110, e.g., a user, or with a multiple users or a group of users. A particular entity 110 can be associated with one, at least one, or more than one user profile. As used herein, a "timestamp" is a value that can represent a date, a time, or both.

Illustrative Components

Figure 2:
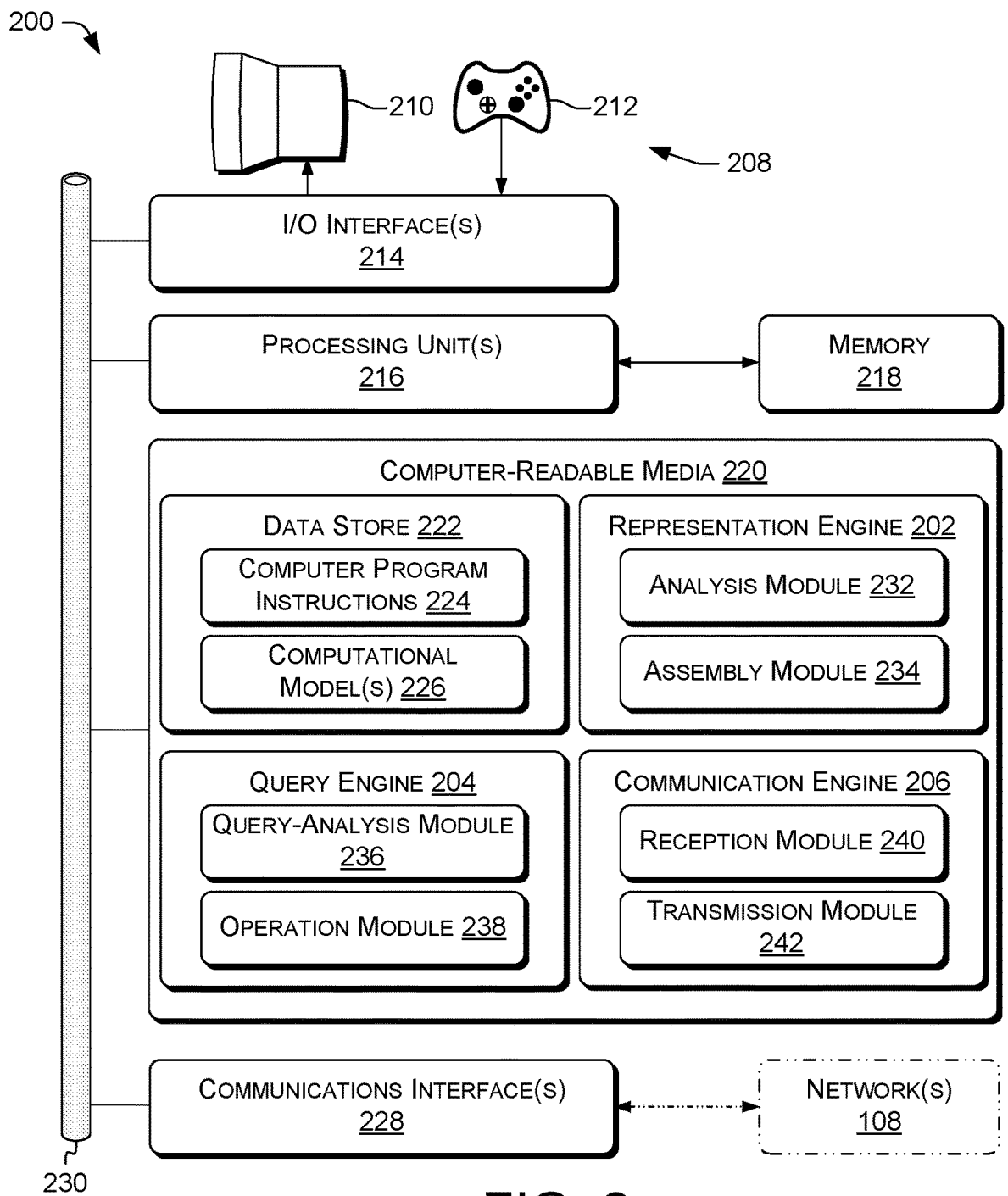
FIG. 2 is a block diagram depicting an example computing device configured to participate in determining and operating computational model(s) according to various examples described herein.

FIG. 2 is an illustrative diagram that shows example components of an computing device 200, which can represent computing device(s) 102 and/or 104, and which can be and/or implement a computational-model determination and/or operation system, device, and/or apparatus, according to various examples described herein. Computing device 200 can include and/or be included in a system and/or device for determining and/or operating a computational model as described herein. Computing device 200 can implement a representation engine 202, which can represent representation engine 120, FIG. 1. Computing device 200 can implement a query engine 204, which can represent query engine 122, FIG. 1. Computing device 200 can implement a communications engine 206, which can represent communications engine 124, FIG. 1.

Computing device 200 can include and/or be connected to a user interface 208, which can represent user interface 130 and/or 144. User interface 208 can include a display 210. Display 210 can include an organic light-emitting-diode (OLED) display, a liquid-crystal display (LCD), a cathode-ray tube (CRT), and/or another type of visual display. Display 210 can be a component of a touchscreen, and/or can include a touchscreen. User interface 208 can include various types of output devices described above with reference to user interface 130 and/or 144. In some examples, computing device 200 can be communicatively connected with a user interface 144, FIG. 1, of another computing device.

User interface 208 can include a user-operable input device 212 (graphically represented as a gamepad). User-operable input device 212 can include various types of input devices described above with reference to user interface 130 and/or 144, e.g., to provide voice or text input.

Computing device 200 can further include one or more input/output (I/O) interface(s) 214 to allow computing device 200 to communicate with input, output, and/or I/O devices (for clarity, some not depicted). Examples of such devices can include components of user interface 208 such as user-operable input devices and output devices described above with reference to user interface 130 and/or 144. Other examples of such devices can include power meters, accelerometers, and other devices for measuring properties of entity 110, computing device 200, and/or another computing device 102 and/or 104. Computing device 200 can communicate via I/O interface 214 with suitable devices and/or using suitable electronic/software interaction methods. Input data, e.g., of user inputs on user-operable input device 212, can be received via I/O interface 214 (e.g., one or more I/O interface(s)). Output data, e.g., of user interface screens, can be provided via I/O interface 214 to display 210, e.g., for viewing by a user.

The computing device 200 can include one or more processing unit(s) 216, which can represent processing unit(s) 114 and/or 134. In some examples, processing unit(s) 216 can include and/or be connected to a memory 218, e.g., a RAM and/or cache. Processing units 216 can be operably coupled to the I/O interface 214 and to at least one computer-readable media 220, which can represent computer-readable media 116 and/or 136, FIG. 1.

Processing unit(s) 216 can be and/or include one or more single-core processors, multi-core processors, CPUs, GPUs, GPGPUs, and/or hardware logic components configured, e.g., via specialized programming from modules and/or APIs, to perform functions described herein. For example, and without limitation, illustrative types of hardware logic components that can be used in and/or as processing units 216 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, a processing unit 216 can represent a hybrid device, such as a device from ALTERA and/or XILINX that includes a CPU core embedded in an FPGA fabric. These and/or other hardware logic components can operate independently and/or, in some instances, can be driven by a CPU. In some examples, at least some of computing device(s) 102 and/or 104, FIG. 1, can include a plurality of processing units 216 of multiple types. For example, the processing units 216 in computing device 102(N) can be a combination of one or more GPGPUs and one or more FPGAs. Different processing units 216 can have different execution models, e.g., as is the case for graphics processing units (GPUs) and central processing unit (CPUs).

Computer-readable media 116 can store instructions executable by processing unit(s) 216, and/or instructions executable by external processing units such as by an external central processing unit (CPU) and/or external processor of any type discussed herein. In some examples at least one processing unit 114, e.g., a CPU, graphics processing unit (GPU), and/or hardware logic device, can be incorporated in computing device 200, while in some examples at least one processing unit 114, e.g., one or more of a CPU, GPU, and/or hardware logic device, can be external to computing device 200.

Computer-readable media 220, e.g., computer storage media, can store a plurality of modules of the representation engine 202, the query engine 204, and/or the communications engine 206; examples are discussed below. Processing unit(s) 216 can be configured to execute modules of the plurality of modules. For example, the computer-executable instructions stored on the computer-readable media 220 can upon execution configure a computer such as a computing device 200 to perform operations described herein with reference to the modules of the plurality of modules. The modules stored in the computer-readable media 220 can include instructions that, when executed by the one or more processing units 216, cause the one or more processing units 216 to perform operations described below.

Computer-readable media 220 can also include an operating system (omitted for brevity). In some examples, an operating system is not used (commonly referred to as a "bare metal" configuration). In some examples, the operating system can include components that enable and/or direct the computing device 200 to receive data via various inputs (e.g., user controls, network and/or communications interfaces, memory devices, and/or sensors), and process the data using the processing unit(s) 216 to generate output. The operating system can further include one or more components that present the output (e.g., display an image on an electronic display, store data in memory, and/or transmit data to another computing device). The operating system can enable a user to interact with the computing device 200 using a user interface. Additionally, the operating system can include components that perform various functions generally associated with an operating system, e.g., storage management and internal-device management.

In the illustrated example, computer-readable media 220 includes a data store 222. In some examples, data store 222 can include data storage, structured and/or unstructured, such as a database (e.g., a Structured Query Language, SQL, and/or NoSQL database) and/or data warehouse. In some examples, data store 222 can include a corpus and/or a relational database with one or more tables, arrays, indices, stored procedures, and so forth to enable data access. Data store 222 can store data for the operations of processes, applications, components, and/or modules stored in computer-readable media 220 and/or computer instructions in those modules executed by processing unit(s) 216. In some examples, the data store can store computer program instructions 224 (e.g., instructions corresponding to processes described herein and/or to other software executable by processing unit(s) 216), one or more computational models (CMs) 226, which can represent computational models 126, FIG. 1, database schema(s), and/or any combination thereof. In some examples, computational models 226 can include tensors, as discussed below.

The computing device 200 can also include a communications interface 228, which can represent communications interface 128 and/or 142. For example, communications interface 228 (e.g., one or more communications interface(s)) can include a transceiver device such as a network interface controller (NIC) to send and receive communications over a network 108 (shown in phantom), e.g., as discussed above. As such, the computing device 200 can have network capabilities. Communications interface 228 can include any number of network, bus, and/or memory interfaces, in any combination, whether packaged together and/or separately. In some examples, communications interface 228 can include a memory bus internal to a particular computing device 102 or 104, transmitting via communications interface 228 can include storing the transmitted data in memory 218 or computer-readable media 220, and receiving via communications interface 228 can include retrieving data from memory 218 or computer-readable media 220.

For example, the computing device 200 can exchange data with computing devices 102 and/or 104 (e.g., laptops, computers, and/or servers) via one or more network(s) 108, such as the Internet. In some examples, computing device 200 can receive data from one or more data source(s) (not shown) via one or more network(s) 108. Example data source(s) can include computing devices 102 and/or 104, data aggregators, and/or data feeds, e.g., accessible via application programming interfaces (APIs). The processing units 216 can retrieve data from the data source(s), e.g., via a Hypertext Transfer Protocol (HTTP) request such as a GET to a Web Services and/or Representational State Transfer (REST) API endpoint.

In some examples, the processing unit(s) 216 can access the module(s) on the computer-readable media 220 via a bus 230, which can represent bus 118 and/or 138, FIG. 1. I/O interface 214 and communications interface 228 can also communicate with processing unit(s) 216 via bus 230.

The modules of the representation engine 202 stored on computer-readable media 220 can include one or more modules, e.g., shell modules and/or API modules (and likewise throughout the document), which are illustrated as an analysis module 232 and an assembly module 234.

The modules of the query engine 204 stored on computer-readable media 220 can include one or more modules, which are illustrated as a query-analysis module 236 and an operation module 238.

The modules of the communications engine 206 stored on computer-readable media 220 can include one or more modules, which are illustrated as a reception module 240 and a transmission module 242.

In the representation engine 202, the query engine 204, and/or the communications engine 206, the number of modules can vary higher and/or lower, and modules of various types can be used in various combinations. For example, functionality described associated with the illustrated modules can be combined to be performed by a fewer number of modules and/or APIs and/or can be split and performed by a larger number of modules and/or APIs. For example, the analysis module 232 and the query-analysis module 236 can be combined in a single module that performs at least some of the example functions described below of those modules, and likewise the reception module 240 and the transmission module 242 or the query-analysis module 236 and the operation module 238. In some examples, computer-readable media 220 can include a subset of the above-described modules.

Figure 3:
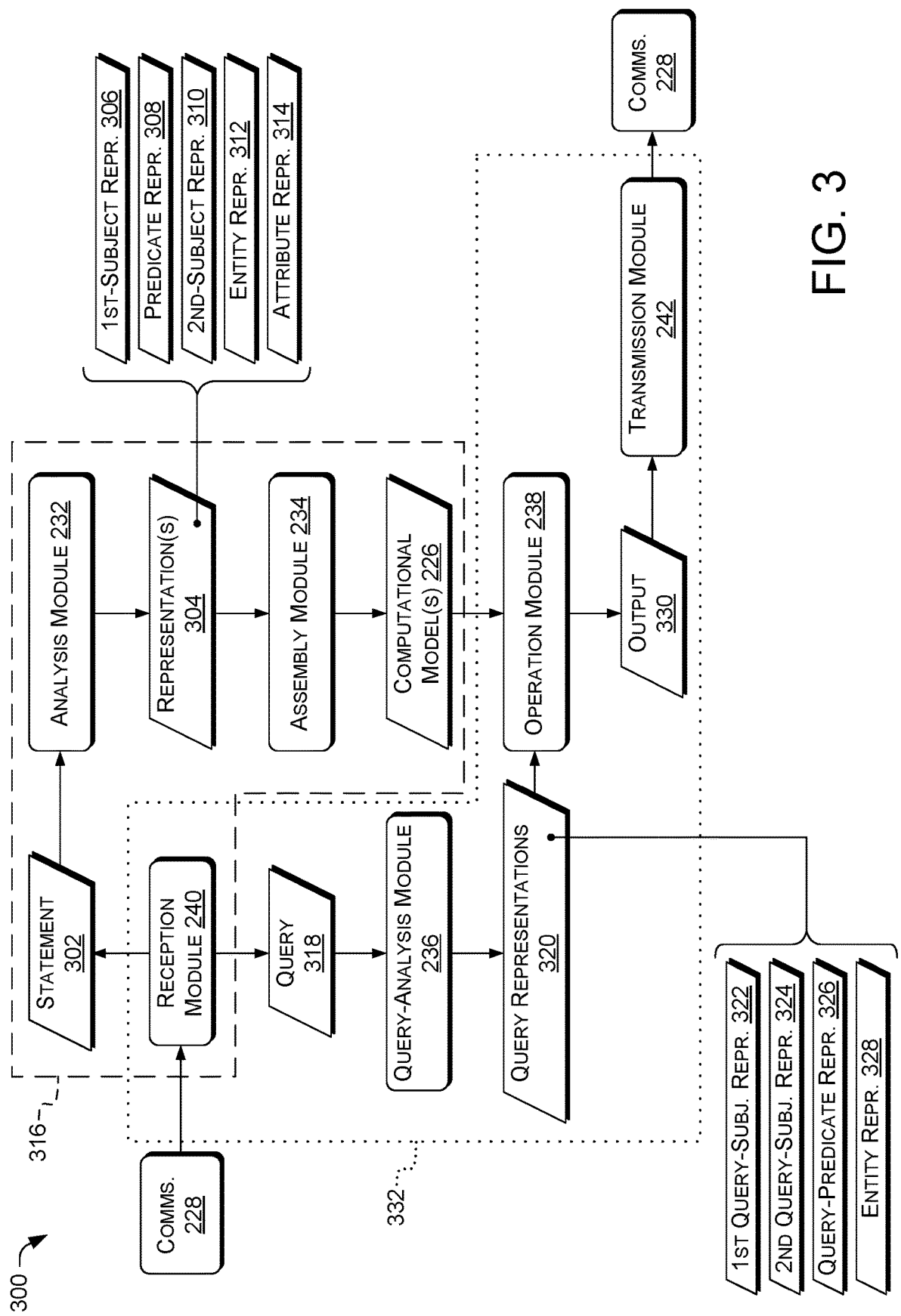
FIG. 3 is a dataflow diagram depicting example module interactions during determination and operation of a computational model, and example data items, according to various examples described herein.

FIG. 3 is a dataflow diagram 300 illustrating example interactions between the modules illustrated in FIG. 2. For clarity, communications interface 228 is depicted multiple places in this figure. Such depiction does not constrain the number of communications interface(s) 228 that may be used. Further details of operations herein are described below with reference to FIGS. 4-13. Modules described below can be configured to perform functions described below. For clarity, data flows primarily related to operation are shown solid and data flows primarily related to determination of computational models are shown dashed.

In some examples, the reception module 240 can be configured to receive a statement 302 via the communications interface 228. The analysis module 232 can determine one or more representations 304 (abbreviated "rep" or "reps" herein and in the figures) of statement 302 (or portions thereof, and likewise throughout the document), or one or more respective representations 304 corresponding to individual ones of a plurality of statements 302. The statements 302 can include, e.g., text, audio, or other data representing facts, entities, relationships between facts or entities, or other information to be encoded for representation by computational model (or models, and likewise throughout the document) 226. In an example of pathfinding discussed throughout this document, an example statement 302 is "the bedroom is south of the hallway." In this example, the first subject is "bedroom," the second subject is "hallway," and the predicate is "is south of" In the illustrated example, representations 304 can include one or more of a first-subject representation 306, a predicate representation 308, a second-subject representation 310, an entity representation 312, or an attribute representation 314.

In some examples, the analysis module 232 can be configured to determine a tagged representation of the statement 302. For example, the analysis module 232 can apply a parser such as the STANFORD Dependency Parser or other natural-language parser to the statement 302 to determine the tagged representation. The tagged representation can include, e.g., tags representing parts of speech, such as nouns or verbs. The tagged representation can additionally or alternatively include, e.g., a parse tree with edge labels such as an edge labeled "direct object" pointing from a verb to the noun (or root of the noun phrase) that is the direct object of that verb. Part-of-speech tags and edge labels can be selected from, e.g., the STANFORD set or the Universal Dependencies set. In some examples, the tagged representation can include both parts of speech for words in a statement 302 and relationships between those words.

In some examples, the analysis module 232 can be configured to determine at least one of the representations 304, e.g., at least one of the first subject representation 306, the second subject representation 310, or the predicate representation 308, based at least in part on the tagged representation. For example, the analysis module 232 can apply predetermined patterns to the tagged representation to determine the representations. For example, if the tagged representation contains a single verb, and that verb is "has," "belongs to," "owns," "goes to," or similar terms, the analysis module 232 can determine that the corresponding statement 302 expresses a containment relationship. In another example, if the tagged representation includes exactly two nouns, the analysis module 232 can determine the subject representations 306 and 310 based on those two nouns, respectively (or vice versa). In some examples, the tagged representation can include a parse tree of the statement 302 and the analysis module 232 can compute a cover on the parse tree using a library of tree patterns representing, e.g., subjects or predicates. In some examples, the analysis module 232 can locate, in the statement 302 or the tagged representation thereof, verbs or other words in a predetermined vocabulary. The analysis module 232 can then extract information about, e.g., subjects or predicates based on predetermined rules associated with the words in the vocabulary. An example of such a rule is "the verb 'owns' is preceded by a noun representing the first subject and followed by a noun representing the second subject."

An example of a statement 302 is "Mary goes to the garden." The STANFORD parse of this statement 302 is "(ROOT (S (NP (NNP Mary)) (VP (VBZ goes) (PP (TO to) (NP (DT the) (NN garden)))) (. .)))". The universal dependencies for this statement include "nmod(goes-2, garden-5)", indicating that "garden" is a nominal modifier of the verb "goes".

In some examples, the analysis module 232 can be configured to locate agents (e.g., personal names, such as "Mary") in the statement 302, e.g., by detecting words or nouns starting with capital letters, or by retrieving the subject of the sentence from the tagged representation. The analysis module 232 can then determine the role of an agent based on the relationships between the agent word(s) and verb(s) (actions) or other noun(s), e.g., objective(s) (targets). For example, if the action verb is followed by, and related to, a preposition and a target location, the action can be determined to relate to relocation or movement. In some examples, the analysis module 232 can determine that an "nmod" dependency between the verb and the objective indicates relocation or movement. In some examples, the agent can be a first subject, e.g., a containee, and the statement 302 can express that the agent now belongs to (is located in) a location container represented by the objective word(s) (e.g., "the garden"). As a result, the analysis module 232 can determine the first-subject representation 306 representing the agent (e.g., "Mary") and the second-subject representation 310 representing the objective (e.g., "garden").

Another example of a statement 302 is "Mary has the football." The STANFORD parse of this statement 302 is "(ROOT (S (NP (NNP Mary)) (VP (VBZ has) (NP (DT the) (NN football))) (. .)))". The universal dependencies for this statement include "dobj(has-2, football-4)", indicating that "football" is a direct object of the verb "has".

In some examples, if the action verb is followed by, and related to, a direct object, the action can be determined to relate to possession of that object. In some examples, the analysis module 232 can determine that a "dobj" dependency between the verb and the objective indicates possession of that object. In some examples, the agent can be a second subject, e.g., a container, and the objective can be a first subject, e.g., a containee belonging to, or held by, the agent container. As a result, the analysis module 232 can determine the first-subject representation 306 representing the objective (e.g., "football") and the second-subject representation 310 representing the agent (e.g., "Mary").

In some examples, the analysis module 232 can determine at least one of the representations 304 including a vector (or other tensor, and likewise throughout the document), or portion thereof, of random values. In some examples, at least one of the representations 304 can include a matrix. In some examples, at least two of the representations 304 can include respective vectors or other tensors forming part or all of an orthogonal or orthonormal basis of a space. In some examples, the vectors can have, e.g., 100 elements each, denoted $v \in \mathbb{R}^{100}$ for a vector v having real-valued elements. Throughout this discussion, uses of the terms "vector" and "matrix" together describe not only the situation of an order-1 tensor (vector) and an order-2 tensor (matrix), respectively, but any situation in which one tensor (e.g., a vector) has a first order and another tensor (e.g., a matrix) has a second order greater than the first order. Examples of representations 304, and determination of representations 304, are discussed herein with reference to blocks 402-406, 502-506, 702, 704, 802, 804, 908, 1102, 1104, 1202, 1204, 1210, or 1214, or any of Eqs. (1)-(11), (13), (17), or (23)-(26).

In some examples, the analysis module 232 can determine at least one of the representations 304 including random data, e.g., one or more randomly-selected values. As used herein, the term "random" includes pseudo-random. In some examples, the first-subject representation can include some random data and some predetermined or otherwise non-random data. In some examples, the first-subject representation can include only predetermined or otherwise non-random data.

Assembly module 234 can determine a computational model 226 of the statement 302 or statements 302 based at least in part on at least one, or at least two, of the representations determined by analysis module 232. In the pathfinding example, the computational model can determine the computational model including a vector representation b representing "bedroom," a matrix representation S representing "is south of," and a vector representation h representing "hallway," such that the values satisfy Eq. (1).

$$b=Sh \quad (1)$$

In an example of containment discussed throughout this document, analysis module 232 can determine, based on the statement 302 "Mary got the football," a first representation m representing "Mary" and a second representation f representing "football." Assembly module 234 can then determine a computational model 226 as a tensor product such as that in Eq. (2).

$$p=fm^T \quad (2)$$

In an example of Eq. (2) in which m and f are vectors, p is a matrix having values dependent on, and representing an association between, m (Mary) and f (the football).

In some examples, the computational model 226 can include one or more equations or tensors. In some examples, the computational model 226 can include one or more graphs, e.g., a node representing the hallway linked by an edge labeled "south" to a node representing the bedroom, or a node representing Mary linked with a node representing the football.

In some examples, operations of components in group 316 can be repeated one or more times, e.g., to build computational model 226 representing multiple statements 302. For example, as described below with reference to FIGS. 5, 8, and 12, reception module 240 can receive multiple statements 302. Analysis module 232 can determine respective representations associated with respective statements 302, and can determine mathematical relationships between those representations, e.g., the relationships expressed by Eqs. (1) and (2). Assembly module 234 can determine the computational model 226 based at least in part on at least some of the representations or at least some of the mathematical relationships.

In some examples, assembly module 234 can determine the computational model 226 not by a mathematical optimization process, i.e., by a process other than a mathematical optimization process. Some prior schemes, such as learning-based neural networks, require a mathematical optimization process of training to build a neural-network model for a particular task. Some examples herein do not require such a process, thereby reducing the time and memory required to prepare CM 226 for use compared to the time and memory required to prepare learning-based neural networks according to some prior schemes.

In some examples, the reception module 240 can be configured to receive a query 318 via communications interface 228. For example, query 318 can include, but is not limited to, audio, text, or other data, e.g., of a user query. For example, communications interface 228 can receive at least some of the query 318 in the form of a Hypertext Transfer Protocol (HTTP) request transmitted via a Transmission Control Protocol (TCP) connection. In some examples omitted for brevity, query 318 can be retrieved from computer-readable media 220 instead of or in addition to being received via communications interface 228. In some examples, query 318 can be associated with a user, e.g., entity 110. For example, a query 318 including an HTTP request can include a URL parameter, HTTP cookie, or other identifying information associated with the user.

The query-analysis module 236 of the query engine 204 can, in parallel with, or prior or subsequent to, processing by analysis module 232 or assembly module 234, determine one or more representations 320 (e.g., query representations) of at least some information of the query 318. For example, the query-analysis module 236 can determine representations 320 of, e.g., a first subject, second subject, predicate, or entity based at least in part on the query. In some examples, the representations 320 can include respective tensors, e.g., order-1 tensors (vectors). The vectors can be, but are not limited to, one-hot vectors or other vectors, or other types described above with reference to representations 304. In some examples, the representations 320 can include at least one of a first query-subject representation 322, a second query-subject representation 324, a query-predicate representation 326, or an entity representation 328. Examples of representations 320, and determination of representations 320, are discussed herein with reference to blocks 410, 514, 708, 812, or 916, or Eqs. (12) or (19)-(22).

In some examples, the query-analysis module 236 can be configured to determine a tagged representation of the query, e.g., using the STANFORD Dependency Parser or otherwise as described above with reference to the analysis module 232. In some examples, the query-analysis module 236 can be configured to determine at least one, or at least two, or exactly two, of the query representations 320 based at least in part on the tagged representation. This can be done, e.g., using tree-covering or predetermined rules, or in other ways, e.g., as described above with reference to analysis module 232.

The operation module 238 can operate the computational model 226, e.g., using one or more representations determined by the query-analysis module 236, to determine at least a model output 330 corresponding to query 318. For example, given the query "how do I go from the hallway to the bedroom?" the operation module 238 can provide output 330 representing "south," e.g., as described below with reference to FIGS. 5 and 6. In the containment example, given the query "who has the football," the operation module 238 can provide output 330 representing "Mary," e.g., as described below with reference to FIG. 10 and Eq. (22). In some examples, model output 330 can represent, but is not limited to, e.g., an entity or spatial relationship. Various examples are provided herein.

In some examples, output 330 can include text of or representing a response to the query 318 (or a vector embedding that represents the text, and likewise throughout this document). In an example of search, an output 330 can include the text of a hit record to be presented to the user as a possible match to the query 318. An output 330 can include multiple fields of data. For example, an output 330 corresponding to a particular Web-search result can include at least one of, or at least two of, the title or URL of the Web page matching the query 318, an excerpt from the Web page, or a rank of the result in the results to be returned to the user. An output 330 can include information to be presented to entity 110, e.g., a direct answer to a user query 318. For example, in response to a user query 318 having the text "male lead The Martian," the output 330 can include the direct answer "Matt Damon". In some examples, the model output 330 can represent or designate an entity (e.g., "Mike Oldfield"), a place (e.g., "Tokyo"), a path (e.g., "north then east"), or a spatial relationship (e.g., "above and to the right of"); these examples are not limiting.

In some examples, the transmission module 242 can transmit an indication of the model output 330 via the communications interface 228. For example, the transmission module 242 can transmit the indication to computing device 104, FIG. 1.

In some examples, operations of components in group 332 can be repeated one or more times, e.g., to process multiple queries 318 and provide corresponding outputs 330. Examples are discussed below with reference to FIGS. 5 and 8.

As used herein, the term "semantic" refers not to the identity of an item being represented, but to properties of that item in the physical or virtual world in which that item exists, acts, or is effective. As used herein, for example, the representation $[1\ 0\ 0]^T$ may represent an automobile, but does not carry any semantic information, e.g., about the number of wheels or doors, or the color of the paint, of that automobile. In some examples, the actual numerical values in a representation are not determined based on any of the properties of the item being represented, i.e., the semantics of that item, but merely to the identity of that item.

Accordingly, in some examples, at least one of the representations 304 or 320 lacks representation of, e.g., does not represent, semantic information of the statement 302 or the item being represented, e.g., a subject, predicate, entity, or attribute of the statement 302. Similarly, in some examples, representations in a plurality of the representations 304 or 320, or all of the representations 304, or all of the representations 320, do not represent semantic information of the item being represented. In some prior schemes, representations carry semantic content, so that, e.g., the representation for "baseball" is closer to the representation for "football" than for the representation to "patents." In some examples herein, the distance (in a suitable metric) between representations is substantially uncorrelated with semantic dimensions of the items being represented; these examples are not limiting. In a nonlimiting example, "baseball," "football," and "patents" are represented by three axis-aligned unit vectors in a three- or higher-dimensional space. Therefore, in this nonlimiting example, each of those is equally far from the other two, so the representations do not themselves carry semantic significance.

In some examples, assembly module 232 can be configured to determine one or representations 304 or 320, or CM 226, not by, other than by, or without determining semantic labels based at least in part on the statement 302 being represented. Some prior schemes assign semantic labels, e.g., indicating which portion of a statement represents a "cause" and which portion represents an "effect," or otherwise subdividing statements based on features of the real or virtual world in the context of which the statement is made. Some examples herein do not require such labeling, and therefore can save memory and processor time compared to prior schemes that consult a database of facts about the real world in order to analyze and semantically tag input statements.

Illustrative Processes

Figure 4:
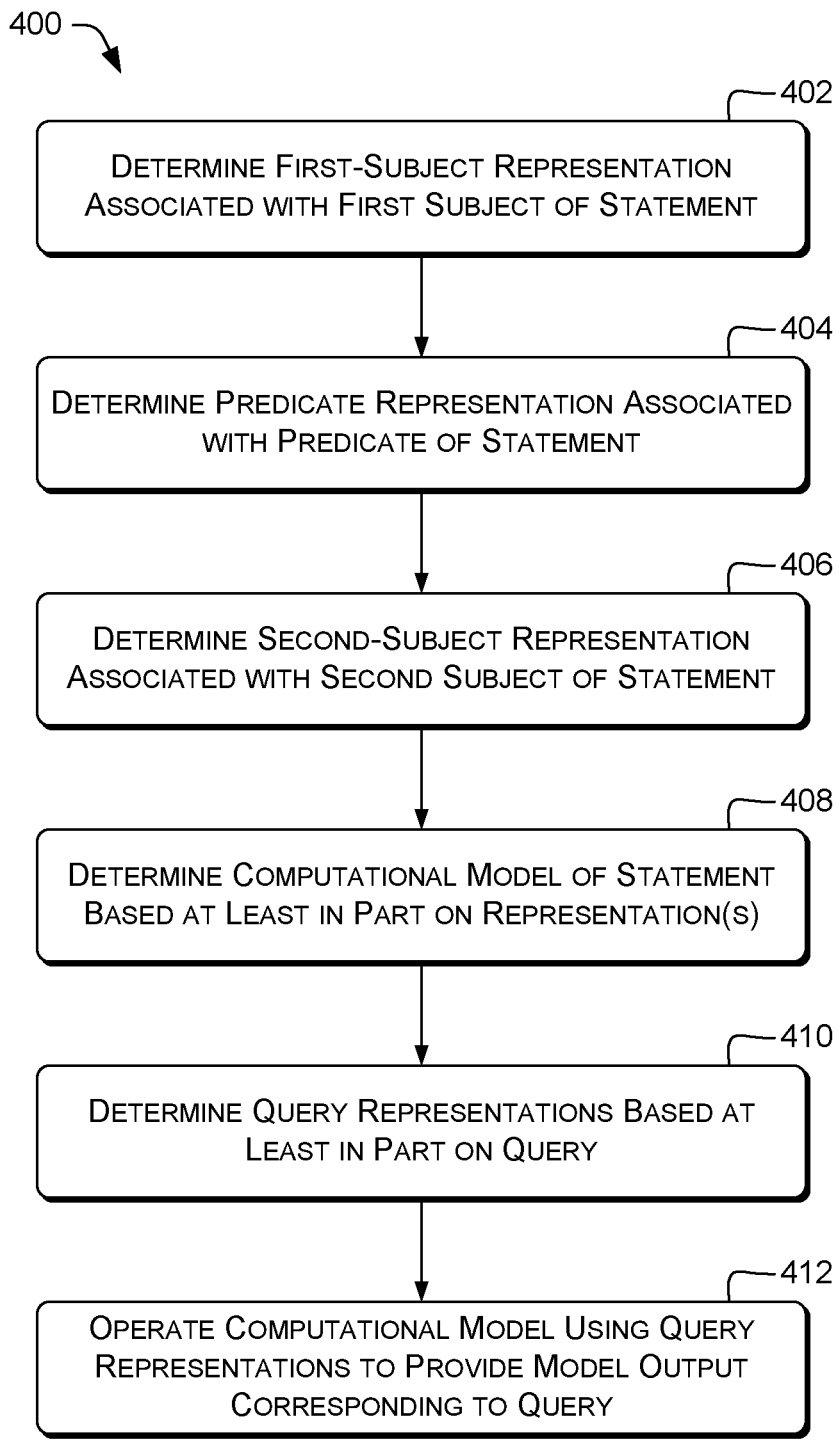
FIG. 4 is a flow diagram that illustrates example processes for determining and operating computational model(s) according to various examples described herein.

FIG. 4 is a flow diagram that illustrates an example process 400 for determining and operating computational model(s). Example functions shown in FIG. 4 and other flow diagrams and example processes herein can be implemented on and/or otherwise embodied in one or more computing device(s) 102 and/or 104, e.g., a computing device 200, e.g., using software running on such device(s). For the sake of illustration, the example process 400 is described below with reference to processing unit 216 and other components of computing device 200, FIG. 2, that can carry out and/or participate in the steps of the exemplary method. However, other processing unit(s) such as processing unit 114 and/or other components of computing device(s) 102 and/or 104 can carry out step(s) of described example processes such as process 400. Similarly, exemplary method(s) shown in FIGS. 5-13 are also not limited to being carried out by any specifically-identified components.

The order in which the operations are described in each example flow diagram and/or process is not intended to be construed as a limitation, and any number of the described operations can be combined in any order and/or in parallel to implement each process. In each flow diagram, fewer than all of the depicted operations can be performed, except as expressly noted. Moreover, the operations in each of FIGS. 4-13 can be implemented in hardware, software, and/or a combination thereof. In the context of software, the operations represent computer-executable instructions that, when executed by one or more processors, cause the one or more processors to perform the recited operations. In the context of hardware, the operations represent logic functions implemented in circuitry, e.g., datapath-control and finite-state-machine sequencing functions. Therefore, descriptions of operations below also describe such software or hardware structures to carry out the described functions.

In some examples, at block 402, a first-subject representation 306 associated with a first subject of a statement 302 can be determined. For example, in the statement "the bedroom is south of the hallway," the first subject can be "bedroom" or "hallway." For brevity, and without limitation, examples will be discussed herein in which the first subject is "bedroom." As noted above, the first-subject representation 306 can include, but is not limited to, e.g., a one-hot vector, can include random or non-random data, or can form part of a basis, e.g., an orthonormal basis.

In some examples, at block 404, a predicate representation 308 associated with a predicate of the statement 302 can be determined. In the example above, the predicate can be "is south of." In some examples, the predicate representation 308 can represent a direction, e.g., "north of," "south of," east of" or "west of," or a spatial relationship, e.g., "above," "below," "left of" "right of" "ahead of" or "behind"; these examples are not limiting.

In some examples, at block 406, a second-subject representation 310 associated with a second subject of the statement 302 can be determined. In the example above, the second subject can be "hallway." As noted above, the second-subject representation 310 can include any of the types listed above. In some nonlimiting examples, the first-subject representation 306 and the second-subject representation 310 can be orthogonal to each other, e.g., as part of an orthogonal or orthonormal basis, or can be linearly independent of each other.

In some examples, the second-subject representation 310 can be determined based at least in part on, e.g., as a product of, the first-subject representation 306 and the predicate representation 308. For example, given a matrix predicate representation 308 S and a vector first-subject representation 306 h, the second-subject representation 310 b can be computed as in Eq. (1) using a matrix-vector multiplication to produce the vector b.

In some examples, at least one of blocks 402, 404, or 406 can include determining at least one of the first-subject representation 306, the predicate representation 308, or the second-subject representation 310, respectively, comprising random data. Examples are discussed above, e.g., with reference to the analysis module 232, FIGS. 2 and 3.

In some examples, at block 408, a computational model 226 of the statement 302 can be determined based at least in part on the first-subject representation 306, the predicate representation 308, or the second-subject representation 310. For example, the computational model 226 can include equations or graph nodes, as described above.

In some examples, the computational model 226 includes one or more tensors. A tensor product operation ⊗ can be defined that outputs a tensor having an order equal to the sum of the orders of the input tensors. Throughout this document, parenthesized superscripts on tensor variables denote the order of those tensor variables. For example, the tensor product of two vectors u and v, yielding a matrix t, can be expressed as in Eq. (3).

$$t^{(2)} = u^{(1)} \otimes v^{(1)} = uv^T \quad (3)$$

Similarly, tensor products for multidimensional tensors can be formed as in Eq. (4).

$$U^{(n)} \otimes V^{(m)} = T^{(n+m)}, \text{ where } T_{a_1 \ldots a_n b_1 \ldots b_m} = U_{a_1 \ldots a_n} V_{b_1 \ldots b_m} \quad (4)$$

In some examples, computational model 226 can include a tensor m as shown in Eq. (5).

$$m = S \otimes b \otimes h \quad (5)$$

In this example, tensor m represents the relationship that the "bedroom is south of the hallway." In some nonlimiting examples, tensors S, b, and h have the same shape (i.e., the same order and dimensions), or have compatible shapes for the tensor product.

In some examples, computational model 226 can include the sum of multiple tensors such as tensor m. In some nonlimiting examples, tensors such as S, b, and h are linearly independent, or are elements of an orthogonal or orthonormal basis. For clarity of explanation, and without limitation, examples herein are discussed with reference to an orthonormal basis except where otherwise indicated.

In some examples, at block 410, based at least in part on a query, one or more query representations, e.g., two query representations, can be determined. The two query representations can include at least two of a first query-subject representation 322, a second query-subject representation 324, and a query-predicate representation 326. For example, in the query "how do I go from the hallway to the bedroom?" the first query-subject representation 322 can be "hallway" and the second query-subject representation 324 can be "bedroom." In the query "what is south of the hallway?" the second query-subject representation 324 can be "bedroom" and the query-predicate representation 326 can be "is south of."

In some examples, at block 412, the computational model 226 can be operated using the two query representations to provide a model output corresponding to the query. Examples are discussed above, e.g., with reference to operation module 238. In some nonlimiting examples, the model output 330 can represent (e.g., indicate, correspond to, etc.) a relationship between the query representations 320 (e.g., the two query representations 320) and at least some information in the computational model 226. In some nonlimiting examples, the model output can correspond to one of a first subject, a second subject, or a predicate that is not specified in the query, e.g., "south" or "bedroom" for the preceding two examples, respectively.

In some examples, e.g., using equation or graph representations, the relationship can include a path between a first of the two query representations 320 and a second of the two query representations 320 along edges defined by the computational model 226, and the at least some information in the CM 226 can include at least some of those edges. The model output can correspond to or represent the path. Block 412 can include determining the path. In some examples, the relationship can include a spatial relationship between entities, e.g., "above" or "below."

In some examples, the relationship can include an entity in CM 226 satisfying conditions in query 318. The at least some information in the CM 226 can include the entity. For example, in response to the above example query 318 "what is south of the hallway?" the relationship can be the entity "bedroom." Further examples of determining model output 330 are discussed below with reference to FIG. 6.

For example, in the query "how do I go from the hallway to the bedroom?" the operation module 238 can traverse a graph in computational model 226 starting from a node representing "hallway" until reaching a node representing "bedroom." The operation module 238 can then report the sequence of labels on the path (provided a path is found), in this example "south" for the single edge encountered. Paths can be found using, e.g., breadth-first search (BFS), depth-first search (DFS), Dijkstra's algorithm, the Viterbi algorithm, or other path- or shortest-path-finding algorithms. In other examples, paths can be found by successive queries of a tensor-based CM 226, e.g., as described below with reference to FIG. 6, 9, or 10.

Figure 5:
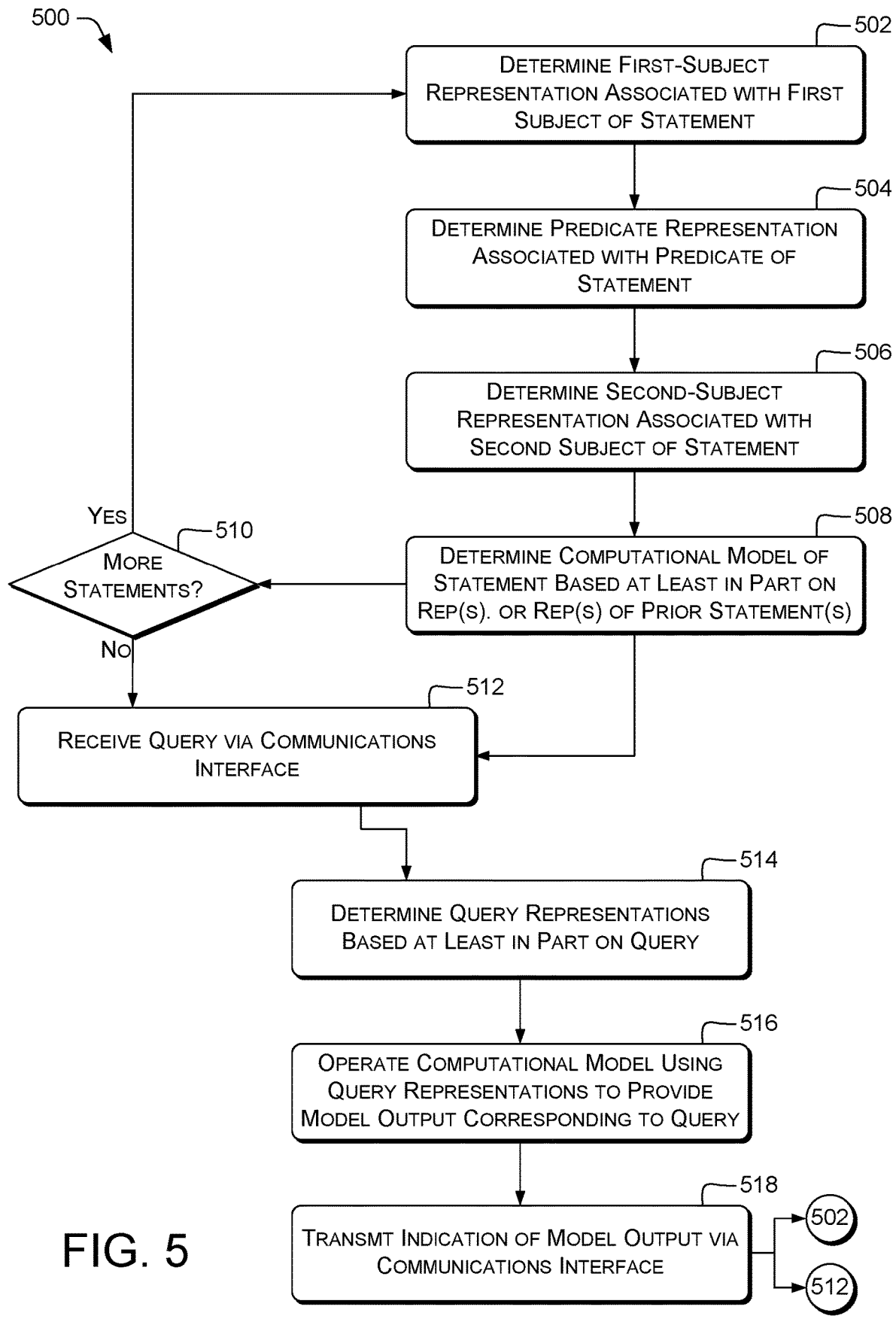
FIG. 5 is a flow diagram that illustrates example processes for determining and operating computational model(s) according to various examples described herein.

FIG. 5 is a flow diagram that illustrates an example process 500 for determining and operating computational model(s).

Block 502 can represent block 402, block 504 can represent block 404, and block 506 can represent block 406.

In some examples, at block 508, which can represent block 408, a computational model 226 can be determined. The CM 226 can, e.g., represent part or all of the statement. The CM 226 can be determined based at least in part on at least one of the representations determined at blocks 502, 504, or 506. In some examples, Blocks 502-508 can include producing the CM 226 of the statement. Block 508 can be followed (or directly followed, and likewise throughout the document) by decision block 510 or block 512.

At decision block 510, it can be determined whether there are more statements to be processed. If not, decision block 510 can be followed by, e.g., block 512 or block 514. If so, decision block 510 can be followed by block 502. This permits performing blocks 502-508, e.g., iteratively, for individual ones of a plurality of statements.

In some examples, the CM 226 can additionally or alternatively be determined based at least in part on at least one of the representations determined at blocks 502, 504, or 506 for a previous statement. For example, the CM 226 can be determined based at least in part on at least one representation associated with each of a plurality of statements. In some examples, accordingly, at block 502, respective first-subject representations associated with respective first subjects of a plurality of statements can be determined. Operations of block 502 can be executed interleaved with operations of other blocks, e.g., to process one statement to completion before processing the next statement. Additionally or alternatively, operations of block 502 can be executed for one statement in parallel with or in a batch with operations of block 502 for another statement. In some examples, the plurality of statements can include statement 302. In some examples, the respective first-subject representations can include the first-subject representation 306.

In some examples, at block 504, respective predicate representations associated with respective predicates of the plurality of statements can be determined. As with block 502, operations of block 504 with respect to multiple statements can be carried out in series, parallel, or batch, in any combination, and likewise for blocks 506 and 508 as discussed below. In some examples, the respective predicate representations can include the predicate representation 308.

In some examples, at block 506, respective second-subject representations 310 associated with respective second subjects of the plurality of statements can be determined. In some examples, the respective second-subject representations 310 can include the second-subject representation 310.

In some examples, at block 508, the computational model 226 can be determined based at least in part on the respective first-subject representations, the respective second-subject representations, and the respective predicate representations. For example, the CM 226 can include graph nodes and edges defined by multiple statements. This permits multiple statements to be represented in the CM 226 and queried.

In some examples, at block 512, a query 318 can be received, e.g., via the communications interface 228. Examples are discussed above, e.g., with reference to reception module 240. For example, text or other data of a query 318 can be received, or text or other data of a query 318 can be extracted from a received packet, datagram, or other transmission (e.g., an HTTP request).

Block 514 can represent block 410 and block 516 can represent block 412. Block 516 can include determining a model output 330 corresponding to the query 318 that was received at block 512.

In some examples, at block 518, an indication of the model output 330 can be transmitted, e.g., via the communications interface 228. Examples are discussed above, e.g., with reference to transmission module 242. In some examples, block 518 can be followed by block 502. This can permit additional statements to be received and incorporated into CM 226, e.g., during a session. In some examples, block 518 can be followed by block 512. This can permit additional queries to be received and processed, e.g., during a session.

In some examples, block 508 can include determining the computational model 226 including a plurality of mathematical relationships, e.g., equations or graph edges. In some examples, at least one of the plurality of mathematical relationships can correspond to a selected one of the first-subject representations, a selected one of the second-subject representations, and a selected one of the predicate representations. Continuing the path-finding example, two statements can include "the bedroom is south of the hallway" and "the office is south of the bedroom." These statements can be represented as equations, e.g., as Eqs. (1) and (6), respectively.

$$o = Sb \quad (6)$$

Additionally or alternatively, these two statements can be represented as a graph, e.g., shown in Eq. (7).

$$h \xrightarrow{S} b \xrightarrow{S} o \quad (7)$$

In the graph of Eq. (7), the nodes are h, b, and o, and the edges are labeled "S" to indicate the "is south of" relationship. In an example, an inverse predicate can be used, e.g., "is north of," producing the graph shown in Eq. (8).

$$h \xleftarrow{N} b \xleftarrow{N} o \quad (8)$$

In the graph of Eq. (8), the edges are oriented in the opposite direction and labeled with the inverse predicate, "N" for "is north of."

In some examples, one or more of blocks 502-508 can include determining numerical or tensor values for at least some of the representations or mathematical relationships. For example, at least one of the first-subject representation 306 or the second-subject representation 310 can be a result of an earlier computation or determination. Continuing the path-finding example, block 502 can include determining the first-subject representation 306 h, representing "hallway," as, e.g., a d-element vector including random data, or a one-hot unit vector. Block 504 can include determining a non-singular d×d matrix, e.g., including random data. For example, in GNU Octave, the command "full(sprand(d,d, 1))" will determine such a matrix. In an example of north/south, east/west, or other paired relationships, the representations of the elements in a given pair can be inverses. For example, block 504 can include determining a non-singular matrix S as a predicate representation 308 representing "is south of," and determining the inverse of S, $N=S^{-1}$, as a matrix N representing "is north of." Similarly, block 504 can include determining a non-singular matrix E as a predicate representation 308 representing "is south of," and determining the inverse of E, $W=E^{-1}$, as a matrix W representing "is west of." Block 506 can then include determining the second-subject representation 310 b, representing "bedroom," as the matrix-vector product expressed in Eq. (1). In an example, d=6, h is $[1\ 0\ 0\ 0\ 0\ 0]^T$, S is as in Eq. (9) (to three fractional places, and likewise throughout the document), and the resulting b value is $[-5.583\ -4.317\ 2.109\ 5.324\ 2.619\ 1.061]^T$. The resulting o value from Eq. (6) is $[27.046\ 34.901\ -18.761\ -27.583\ -18.083\ -8.138]^T$.

$$S = \begin{bmatrix} -5.583 & -0.956 & 1.242 & -8.298 & 11.493 & 3.016 \\ -4.317 & -2.110 & 1.225 & -4.925 & 8.874 & 1.967 \\ 2.109 & 0.296 & 0.277 & -0.330 & -1.356 & -0.922 \\ 5.324 & 1.110 & 0.285 & 7.308 & -11.316 & -2.768 \\ 2.619 & 1.157 & -2.055 & 3.939 & -5.732 & -0.083 \\ 1.061 & 1.082 & -0.570 & 1.964 & -2.198 & -0.983 \end{bmatrix} \quad (9)$$

In an example of spatial relationships, block 504 can include determining idempotent matrices, e.g., idempotent matrices A, B, L, and R representing the predicates "is above," "is below," "is to the left of," and "is to the right of," respectively. For example, the 2×2 matrices given in Eq. (10) are idempotent: AA=A and so forth. Eq. (10) is for clarity of explanation only; any shape or number of idempotent matrices can be determined.

$$A = \begin{bmatrix} 1 & 3 \\ 0 & 0 \end{bmatrix}; B = \begin{bmatrix} 2 & 4 \\ -\frac{1}{2} & -1 \end{bmatrix}; L = \begin{bmatrix} 5 & 7 \\ -\frac{20}{7} & -4 \end{bmatrix}; \quad (10)$$

$$R = \begin{bmatrix} 6 & 8 \\ -3.75 & -5 \end{bmatrix}$$

The idempotent matrices can then be assembled into predicate representations 308 that can represent combinations, e.g., "is above and to the left of." An example of such a predicate representation 308 is the block-diagonal matrix given in Eq. (11).

$$\mathcal{P}_{ablr} = \begin{bmatrix} a & 0 & 0 & 0 \\ 0 & b & 0 & 0 \\ 0 & 0 & l & 0 \\ 0 & 0 & 0 & r \end{bmatrix} \quad (11)$$

In Eq. (11), matrices a, b, l, and r have the same shape, 0 (zero) represents the zero matrix having the same shape as a, b, l, and r, and each of a, b, l, or r is either the corresponding matrix from Eq. (10), or the identity matrix I. For example, $\mathcal{P}_{AIII}$ represents the predicate "is above," and $\mathcal{P}_{AILI}$ represents the predicate "is above and to the left of." Eq. (11) is for clarity of explanation only; a predicate representation 308 $\mathcal{P}$ can have any number (one or more) of sub-components (e.g., a, b, l, and r in Eq. (11)) of any size. Since matrix $\mathcal{P}_{ablr}$ (or other matrix $\mathcal{P}$) is block-diagonal with idempotent components in these examples, predicate representations 308 for various combinations can be formed by matrix multiplication. For example, $\mathcal{P}_{AIII}\mathcal{P}_{IILI}=\mathcal{P}_{AILI}$.

Using a block-diagonal structure for a predicate representation 308 $\mathcal{P}$ can permit representing and processing combinations of predicates more efficiently than, e.g., representations using discrete variables for each predicate and branch tests in processing statements. Using idempotent sub-matrices can permit providing output in a way that more closely matches users' expectations. For example, in American English, it is permissible to state that the "the shelf is above the floor" and that "the ceiling is above the shelf." It is further permissible to infer from those two statements that "the ceiling is above the floor." However, some non-idempotent representations would infer that "the ceiling is above above the floor," which is not a syntactically valid statement in American English due to the presence of the double relation "above above". Such a statement would likely confuse a user reading the statement. By contrast, in some examples using an idempotent matrix, AA=A, so the system can infer that "the ceiling is above the floor," with only one "above," as the user expects.

In some examples, a statement 302 can represent that a particular fact no longer holds. For example, the statement "I moved the bookends from left of the cabinet to right of the cabinet" indicates that the bookends (k) are to the right of the cabinet (n), e.g., k=Rn, and also that the bookends are not to the left of the cabinet. The latter fact can be represented, e.g., as an edge or equation corresponding to ¬k=Ln, or as the absence of an edge or equation stating that k=Ln. In some examples of a CM 226 using multiple summed tensors, this fact can be represented as the tensor—k⊗L⊗n. Adding this tensor to CM 226 cancels a tensor k⊗L⊗n. In this and other examples, subtracting the tensor relating to a fact from CM 226 can remove that fact from CM 226.

Figure 6:
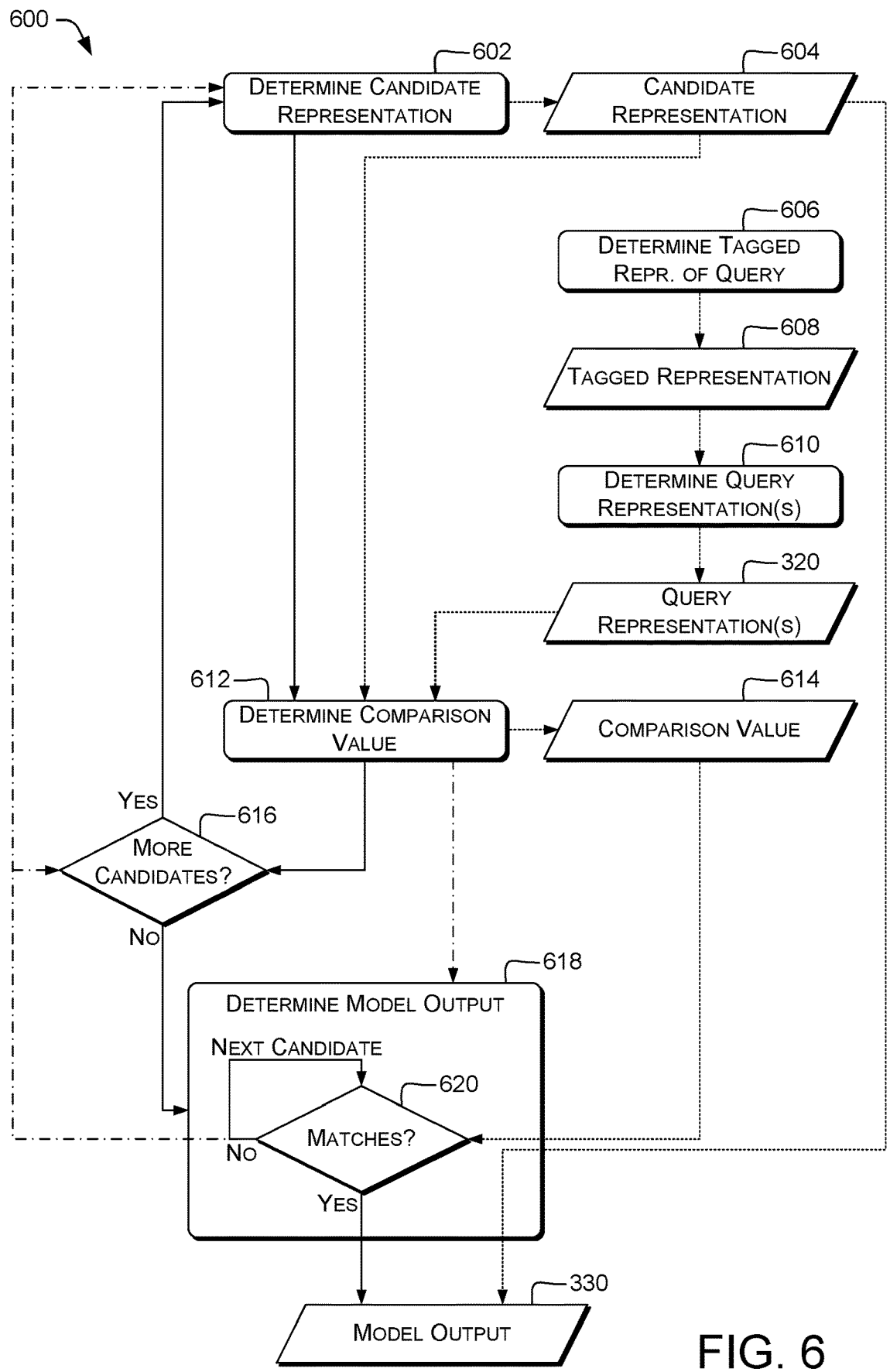
FIG. 6 is a dataflow diagram that illustrates example processes for determining and operating computational model(s), and example data items, according to various examples described herein.

FIG. 6 is a dataflow diagram that illustrates an example process 600 for operating computational model(s), and example data items. For clarity, process flows are shown using solid or dash-dot lines and data flows are shown using stippled lines. Blocks 412 or 516 can include one or more blocks of process 600.

In some examples, at block 602, a candidate representation 604 (or "candidate," for brevity) can be determined. In some nonlimiting examples, the candidate representation 604 can be, represent, or correspond to value(s) that may or will be the model output 330 if those values satisfy or correspond to the query 318. In some examples, the candidate representation 604 can be determined based at least in part on at least one of the plurality of mathematical relationships; one, two, or any number of the query representations 320; or the respective one of the plurality of candidate representations 604. In the path-finding example, the candidate representation 604 can, e.g., include a product of any number, one or more, of matrices from the set {N, S, E, W}, e.g., N, NN, NE, NW, or NNN. In the path-finding example, the candidate NNS is the same as the candidate N, since NS=1.

In some examples, at block 606, a tagged representation 608 of the query 318 can be determined. Examples are discussed above, e.g., with reference to the analysis module 232 or the query-analysis module 236.

In some examples, at block 610, at least one of the query representations 320, e.g., at least one of the two query representations 320, can be determined based at least in part on the tagged representation 608. Examples are discussed above, e.g., with reference to the analysis module 232 or the query-analysis module 236.

In some examples, at block 612, a comparison value 614 can be determined corresponding to the candidate representation 604. For example, candidate representation 604 can be compared to one or more of the query representation(s) 320 to determine a match. In some examples, the comparison value 614 can indicate whether the candidate representation 604 satisfies an equation or other condition(s) expressed in the query 318, when evaluated in the context of the information stored in CM 226. In some examples, the comparison value 614 can be determined based at least in part on at least one of the plurality of mathematical relationships; one, two, or any number of the query representations 320; or the respective one of the plurality of candidate representations 604.

In an example query in the path-finding example, the query 318 can include "how do I go from the office to the hallway?" The two query representations 320 can include the first query-subject representation 322 o (Eq. (6)) and the second query-subject representation 324 h (e.g., a vector of random data, as noted above). The candidate representation 604 can include the matrix product NN. The comparison value 614 γ can indicate whether the product of the candidate representation 604 with the first query-subject representation 322 (determined by CM 226) is equal to the second query-subject representation 324 (also determined by CM 226), as in Eq. (12).

$$\gamma = \left(NNo \stackrel{?}{=} h\right) \quad (12)$$

In this example, γ=True, since, given the values of o, N, and h stored in CM 226, it is the case that NNo=h (equivalent to o=SSh).

In some examples, at decision block 616, it can be determined whether there are more candidate representations 604. If so, decision block 616 can be followed by block 602. If not, decision block 616 can be followed by block 618. This can permit executing blocks 602 and 612 multiple times to determine a plurality of candidate representations 604 and respective comparison values 614 corresponding to respective ones of the plurality of candidate representations 604. For example, the plurality of candidate representations 604 can be determined, e.g., by breadth- or depth-first enumeration of a space of candidates, or by other techniques. In the path-finding example, an example breadth-first enumeration can begin with the candidates N, S, E, W, NN, NE, NW, SS, SE, SW, NNN, NNE, . . . . An example depth-first enumeration can begin with the candidates N, NN, NNN, . . . , S, SS, SSS, . . . . Other enumerations or orders can also be used. In some examples, the candidate representations 604 can be determined by, e.g., graph traversal or search or path-finding.

In some examples using an equational representation of CM 226, the candidate representations 604 can be determined by iterative substitution. For example, o=Sb (Eq. (6)) can be selected as an initial statement. CM 226 can be searched to determine possible expansions of o or b. The expansion b=Sh (Eq. (1)) can be located. Eq. (1) can then be substituted into the initial statement, Eq. (6), to produce o=SSh. The numerical value of o can be tested against the numerical value of SSh to determine whether o=SSh is a fact represented by CM 226. Any number of such substitutions (or, correspondingly, subgraph expansions) can be determined, e.g., in a breadth-first or depth-first order.

In some examples, at block 618, the model output 330 can be determined based at least in part on the comparison value 614 or at least some of the respective comparison values 614. In some examples, block 618 can include decision block 620.

In some examples, at decision block 620, it can be determined whether the respective comparison value 614 for a particular candidate representation 604 indicates that candidate representation 604 corresponds to one of the query representation(s) 320. If not, in some examples, block 618 or decision block 620 can test the comparison value 614 corresponding to another one of a plurality of candidate representations 604 ("next candidate"). On the other hand, if a particular candidate representation 604 corresponds to one of the query representation(s) 320 as determined by decision block 620, block 618 can include providing the particular candidate representation 604 as the model output 330. In some examples, block 618 can provide the model output 330 indicating at least one, or a plurality, of the candidate representations 604, e.g., candidate representation(s) 604 having respective comparison value(s) 614 indicating respective correspondence with at least one query representation 320. Continuing the example above, since comparison value 614 $\gamma$=True for candidate representation 604 NN, block 618 can include providing NN as the model output 330.

In an example of spatial relationships or other examples using idempotent block-diagonal matrices $\mathcal{P}$ such as those discussed above with reference to Eqs. (10) and (11), the candidate representations 604 can include the possible predicates represented in a matrix $\mathcal{P}$. In the example of Eq. (11), the possible predicates are A, B, L, and R. Therefore, the candidate representations 604 can include the four matrices $\mathcal{P}_{AIII}$, $\mathcal{P}_{IBII}$, $\mathcal{P}_{IILI}$, and $\mathcal{P}_{IIIR}$. In some of these examples, the four candidates can be generated (block 602), and then some or all of the candidates can be tested against the query (block 612 and decision block 620). For example, a comparison value $\gamma_x$, $x \in [a, b, l, r]$ can indicate whether the candidate representing predicate x corresponds to the query.

In an example, CM 226 can encode the facts $\sigma = \mathcal{P}_{AIII} \phi$ and $\kappa = \mathcal{P}_{AIII} \sigma$, where $\phi$ represents the floor, $\sigma$ represents the shelf, and $\kappa$ represents the ceiling. Regarding the query "where is the ceiling in relation to the floor?" $\gamma_a$=True since $\kappa = \mathcal{P}_{AIII} \phi$. In some examples, a and b are not inverses. Therefore, if CM 226 encodes either that the ceiling is above the floor or that the floor is below the ceiling, the spatial relationship between the floor and the ceiling can be determined. Therefore, in some examples, process 600 can include testing multiple predicates against the query, e.g., predicates that are not inverses of each other, or each predicate representable in matrix $\mathcal{P}$ or other components of CM 226.

In some examples, such as described above, multiple candidate representations 604 and comparison values 614 can be determined (blocks 602 and 612 and decision block 616), and then the model output 330 can be determined (block 618 and decision block 620). In some examples, individual ones of the candidate representations 604 and the respective comparison values 614 can be determined iteratively (e.g., one candidate at a time). Individual candidate representations 604 can be generated and tested against the query 318 until one of the respective comparison values 614 indicates that the respective one of the plurality of candidate representations 604, in association with the two query representations 320, corresponds to the computational model 226. For example, each comparison value 614 can be checked to determine whether to try the next candidate, or to stop processing because a model output 330 has been found. If so, block 618 can include determining the model output 330 comprising the respective one of the plurality of candidate representations 604.

In some examples, a candidate representation 604 (e.g., N in the path-finding example) can be generated (block 602), compared against query representations 320 (block 612), and checked to determine whether the candidate corresponds to the query (block 618 and decision block 620). In some examples, block 612 can be followed by block 618, as indicated by the dash-dot arrow. In some examples, block 618 can be followed by decision block 616 to determine whether there are more candidates to test. In some examples, block 618 can be followed by block 602 to test another candidate, as indicated by the dash-dot arrow. In some examples, blocks 612 and 618, and decision block 620, can be combined into a single block. In some examples, at least two of blocks 612 and 618, and decision blocks 616 and 620, can be combined into a single block.

Figure 7:
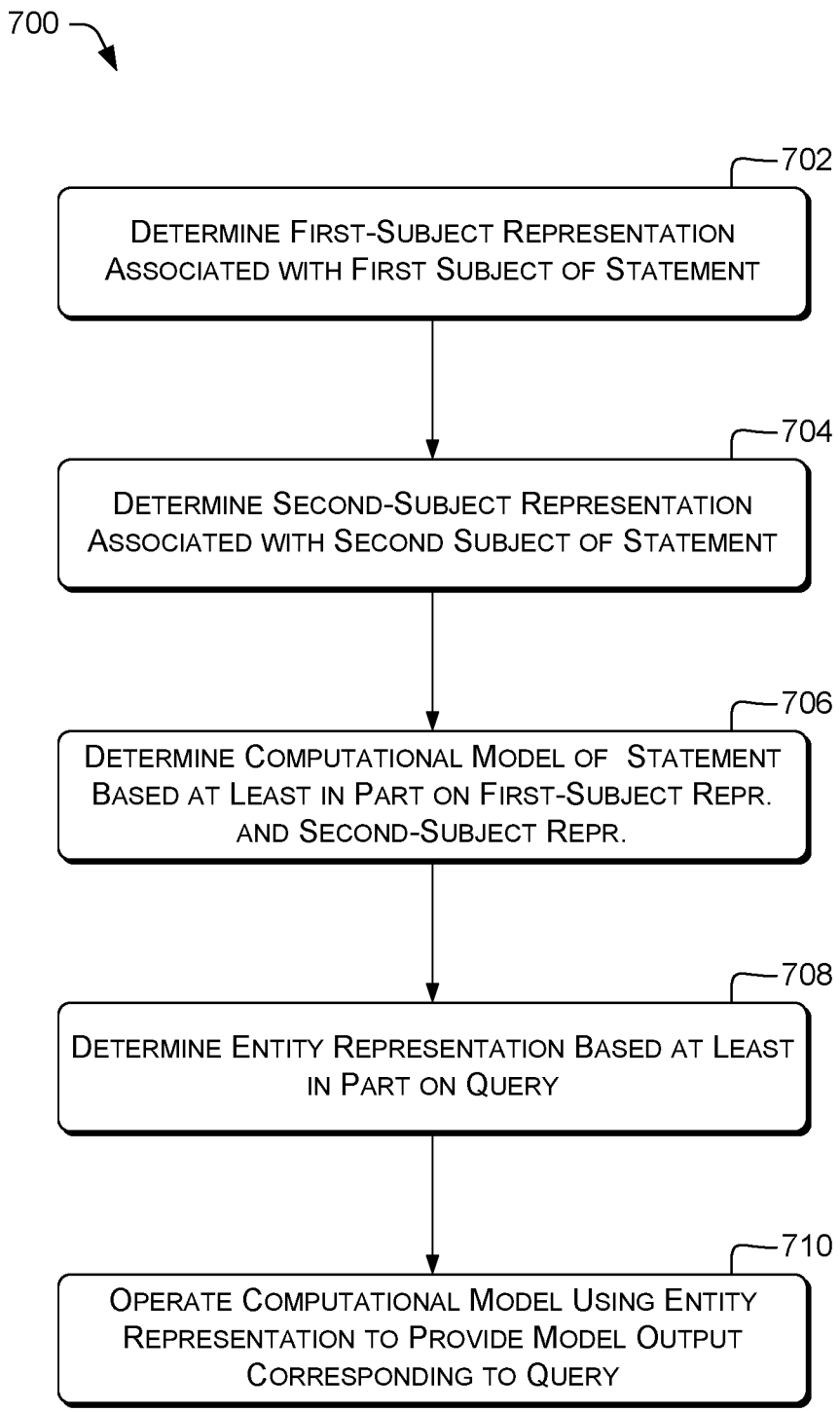
FIG. 7 is a flow diagram that illustrates example processes for determining and operating computational model(s) according to various examples described herein.

FIG. 7 is a flow diagram that illustrates an example process 700 for determining and operating computational model(s). Some examples of process 700 can be used, e.g., in representing and processing facts about, e.g., location, possession, or other forms of container-containee or general two-party transitive relationships.

In some examples, at block 702, a first-subject representation 306 associated with a first subject of a statement 302 can be determined. Examples are discussed above, e.g., with reference to block 402. In some examples, the first subject can include a containee. For example, in the containment example discussed with reference to Eq. (2) (p=fm$^T$), the football (represented by f) can be the containee.

In some examples, at block 704, a second-subject representation 310 associated with a second subject of the statement 302 can be determined. Examples are discussed above, e.g., with reference to block 406. The second subject can include a container. For example, in Eq. (2), Mary (represented by m) can be the container, e.g., the possessor of the football.

Another example statement 302, "Mary went to the garden," can be represented as in Eq. (13).

$$q = mg^T \qquad (13)$$

In Eq. (13), representation q indicates that Mary (m) is contained by (here, is located in) the garden (g).

In some examples, block 702 or block 704 can include determining at least one of the first-subject representation 306 or the second-subject representation 310, respectively, comprising at least some random data, or comprising at least some non-random data, or any combination of random and non-random data. Examples are discussed above, e.g., with reference to the analysis module 232 and the representations 304. In some examples, block 702 or block 704 can include determining the first-subject representation 306 and the second-subject representation 310 as respective members of a set of linearly independent vectors, or as respective members of a basis, e.g., an orthogonal basis or an orthonormal basis. For brevity and without limitation, examples herein are given with reference to an orthonormal bases. For example, m, f, and g can be the three one-hot unit vectors of a three-dimensional space $[1\ 0\ 0]^T$, $[0\ 1\ 0]^T$, and $[0\ 0\ 1]^T$, respectively, as a result of which p in Eq. (2) is the 3×3 matrix of zeros except for $p_{2,1}=1$, and q in Eq. (13) is the 3×3 matrix of zeros except for $q_{1,3}=1$.

In some examples, at block 706, a computational model 226 of the statement 302 can be determined based at least in part on the first-subject representation 306 and the second-subject representation 310. For example, the computational model 226 can include p in Eq. (2) or q in Eq. (13). Further examples of computational model 226 are discussed below.

In some examples, at block 708, an entity representation 328 can be determined based at least in part on a query 318. The entity representation 328 can represent a significant entity in the query 318, e.g., an entity corresponding to a search key expressed in the query 318. The entity representation 328 can represent, e.g., a person, object, location, or other entity. In some examples, the entity representation 328 can correspond to a subject (e.g., a first subject or containee) or a predicate expressed in the query 318. For example, in the containment example, given the query "Where is Mary?" the entity representation 328 can be m, the representation of Mary (the entity).

In some examples, at block 710, the computational model 226 can be operated using the entity representation 328 to provide a model output 330 corresponding to the query 318. In the containment example, Mary can be located using vector m (the entity representation 328) and matrix q (the CM 226) as in Eq. (14).

$$\text{model output}=(m^T q)^T=(m^T(mg^T))^T=(g^T)^T=g \quad (14)$$

In Eq. (14), $m^T m = m \cdot m = 1$ since m is a unit vector. Therefore, the left term (first subject of a statement; containee) in matrix q of CM 226 cancels out, leaving the right term (second subject of a statement; container), g, which represents the garden. Therefore, according to this example CM 226, Mary is in the garden.

Figure 8:
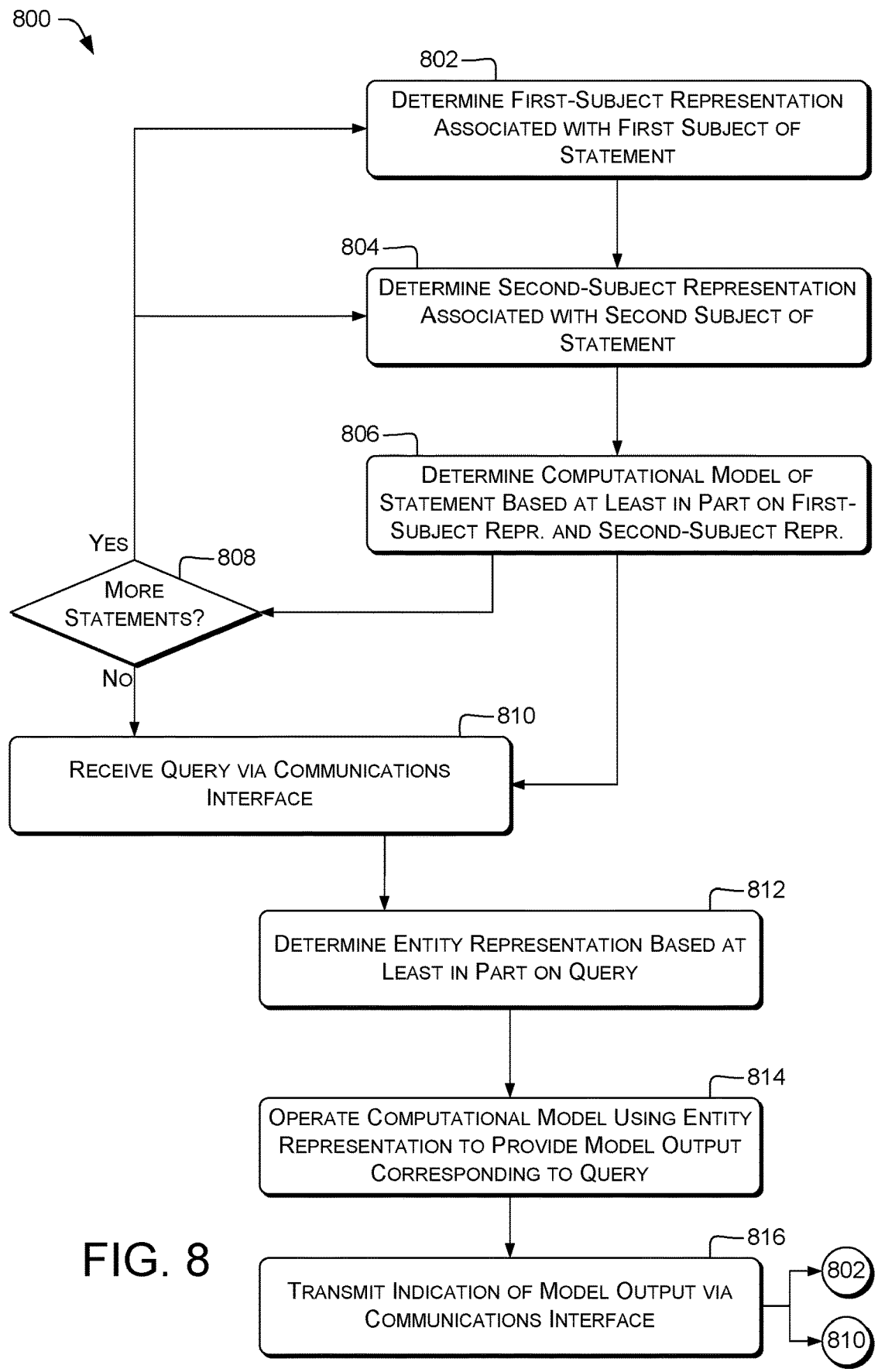
FIG. 8 is a flow diagram that illustrates example processes for determining and operating computational model(s) according to various examples described herein.

FIG. 8 is a flow diagram that illustrates an example process 800 for determining and operating computational model(s).

Block 802 can represent block 702. Block 804 can represent block 704. Block 806 can represent block 706. Block 806 can be followed by decision block 808 or block 810.

In some examples, at decision block 808, it can be determined whether there remain more statements 302 to be processed. Examples are discussed above, e.g., with reference to decision block 510. If so, decision block 808 can be followed by block 802 or block 804. If not, decision block 808 can be followed by block 810. This can permit performing blocks 802-806 for individual ones of a plurality of statements 302.

In some examples, therefore, block 802 can include determining respective first-subject representations 306 of respective first subjects of a plurality of statements. The respective first-subject representations 306 can include the first-subject representation 306 discussed above with reference to block 702, but are not required to, and likewise the plurality of statements and the statement discussed above with reference to block 702.

Block 804 can include determining respective second-subject representations 310 of respective second subjects of the plurality of statements. The respective second-subject representations 310 can include the second-subject representation 310 discussed above with reference to block 704, but are not required to.

Block 806 can include determining the computational model based at least in part on the respective first-subject representations 306 and the respective second-subject representations 310. Examples of processing of multiple statements are discussed above, e.g., with reference to FIG. 5. For example, serial, parallel, or batch processing can be used as described above.

In some examples, block 806 can include determining CM 226 including a sum of tensors representing respective statements 302. Continuing the containment example above, CM 226 can be determined as in Eq. (15).

$$p = \begin{bmatrix} 0 & 0 & 0 \\ 1 & 0 & 0 \\ 0 & 0 & 0 \end{bmatrix}; q = \begin{bmatrix} 0 & 0 & 1 \\ 0 & 0 & 0 \\ 0 & 0 & 0 \end{bmatrix}; CM = p+q = \begin{bmatrix} 0 & 0 & 1 \\ 1 & 0 & 0 \\ 0 & 0 & 0 \end{bmatrix} \quad (15)$$

In this example, CM 226 represents both the fact that Mary has the football (Eq. (2)) and the fact that Mary is in the garden (Eq. (13)). Any number of facts can be superimposed and queried, as discussed in more detail below. As noted above, the use of one-hot unit vectors, and the corresponding presence of zero and unity values in p, q, and p+q is for clarity of explanation and is not limiting.

In some examples, as discussed above with reference to FIG. 5, facts can be removed from CM 226 by subtracting corresponding tensors. For example, Eq. (13) specifies q, a fact that Mary is in the garden. If Mary leaves the garden g and goes to the city c, CM 226 can be modified as in Eq. (16).

$$\text{new } CM = CM - mg^T + mc^T \quad (16)$$

This permits CM 226 to be updated both to add new facts and to remove facts that are, e.g., no longer true or no longer relevant.

In some examples, at block 810, a query 318 can be received, e.g., via the communications interface 228. Examples are discussed above, e.g., with reference to block 512. For example, block 810 can include receiving text and determining query 318 from the text.

Block 812 can represent block 708. Block 814 can represent block 710. Block 814 can be followed by block 816.

In some examples, at block 816, an indication of the model output 330 can be transmitted, e.g., via the communications interface 228. Examples are discussed above, e.g., with reference to block 518. For example, the indication can be text, e.g., "Mary," or a copy or symbolic representation of the model output 330, e.g., the vector m. In some examples, block 816 can be followed by block 802. This can permit additional statements to be received and incorporated into CM 226, e.g., during a session. In some examples, block 816 can be followed by block 810. This can permit additional queries to be received and processed, e.g., during a session.

Figure 9:
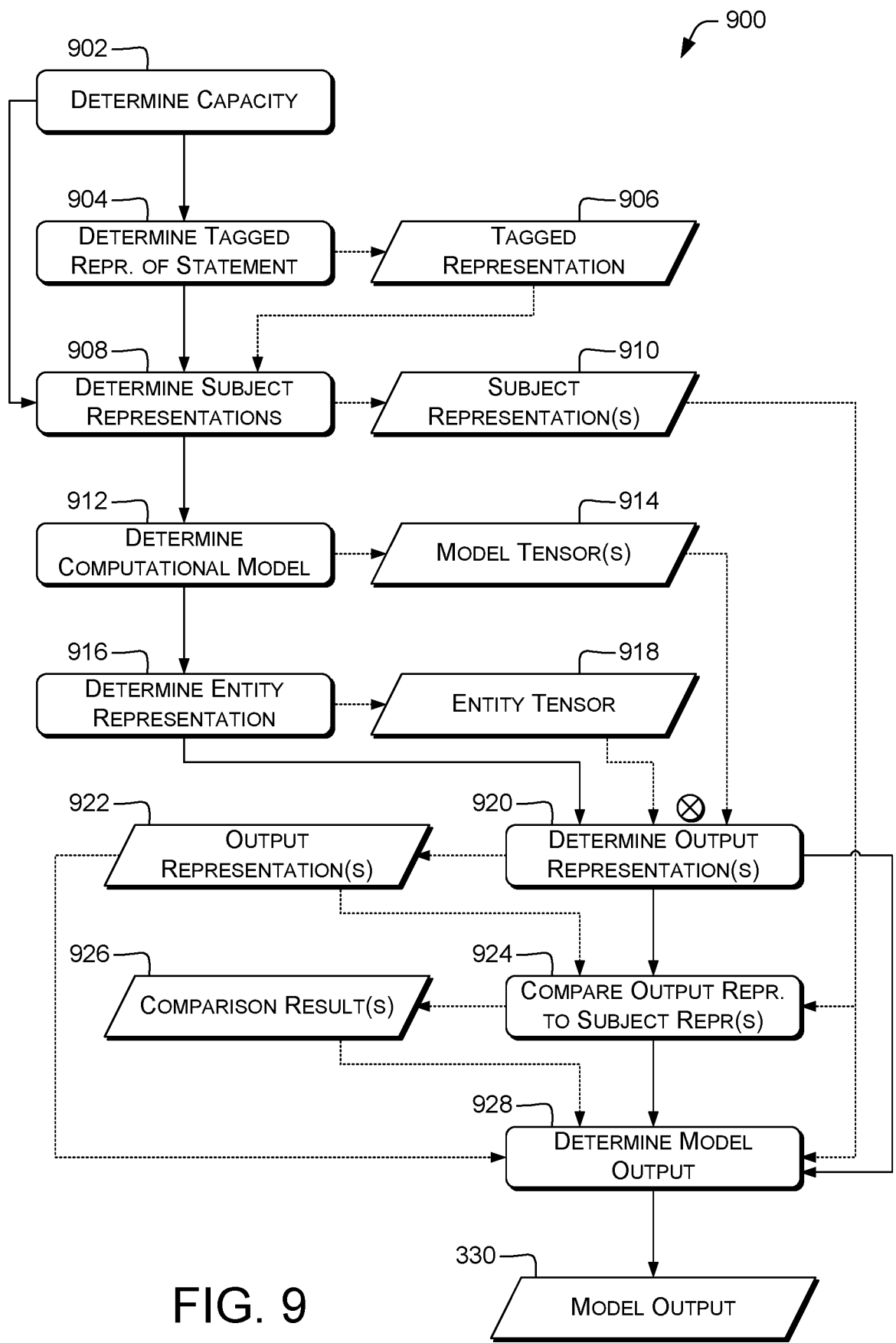
FIG. 9 is a dataflow diagram that illustrates an example process for determining or operating computational model(s), and example data items, according to various examples described herein.

FIG. 9 is a dataflow diagram that illustrates an example process 900 for determining or operating computational model(s), and example data items. For clarity, process flows are shown using solid or dash-dot lines and data flows are shown using stippled lines. Blocks 706-710 can include one or more blocks of process 900. In the containment example, blocks 920, 924, and 928 can be used to determine, from CM 226, the container of a containee given in the query 318.

In some examples, at block 902, a capacity of CM 226 can be determined based at least in part on at least one of: one or more of the plurality of statements 302, a capacity (e.g., memory or CPU capacity) of computing device 200, or configuration parameters related to a particular scenario 100. The capacity can be used as the dimension d of, e.g., d×d model tensors 914, discussed below. The capacity can be, e.g., equal to, greater than, or greater than or equal to the number of such subjects. In some examples, the capacity can be selected equal to twice the number of subjects in the plurality of statements 302. Block 902 can be followed by block 904 or block 908.

In some examples, at block 904, a tagged representation 906 of the statement 302 can be determined, e.g., using a dependency parser. Examples are discussed above, e.g., with reference to the analysis module 232.

In some examples, at block 908, representations 910 of one or more subjects in one or more statements 302 can be determined. Representations 910 can represent first-subject representation 306 or second-subject representation 310, FIG. 3. Block 908 can represent blocks 702, 704, 802, or 804. In some examples using block 904, block 908 can include determining at least one of the first-subject representation 306 or the second-subject representation 310 based at least in part on the tagged representation 906. Examples are discussed above, e.g., with reference to the analysis module 232.

In some examples, block 908 can include determining, for individual subjects (or each subject) referenced in the statements 302, a unique d-element vector representation 910 (e.g., m or g). The vectors assigned to the subjects can together form a basis of the d-dimensional space, or a portion of such a basis.

In the containment example, block 902 can include determining capacity d=6, twice the number of subjects (three). Block 908 can include determining the representations 910 given in Eq. (17).

$$m=[1\ 0\ 0\ 0\ 0\ 0]^T; f=[0\ 1\ 0\ 0\ 0\ 0]^T; g=[0\ 0\ 1\ 0\ 0\ 0]^T. \quad (17)$$

Determining capacity d greater than the number of subjects can permit later adding additional subjects to CM 226. For example, when processing the statement "Mary is in the hallway," block 908 can include determining the representation h=[0 0 0 1 0 0]$^T$ for "hallway." Representations 910 m, f g, and h are all orthogonal, in this example.

In some examples, at block 912, the computational model 226 can be determined including one or more model tensor (s) 914. The model tensors 914 can be determined based at least in part on at least one representation 910, e.g., on the first-subject representation 306, or, for examples involving a plurality of statements 302, on at least one of the first-subject representations 306 (e.g., as discussed above with reference to block 802). The model tensors 914 can additionally or alternatively be determined based at least in part on the second-subject representation 310, or at least one of the second-subject representations 310 (e.g., as discussed above with reference to block 804).

In some examples, one or more model tensor(s) 914 can be determined, e.g., as described above with reference to Eqs. (2), (13), or (15). For example, model tensor(s) 914 can include p, q, or p+q. In some examples, a single model tensor 914 can include the sum of tensors relating to each individual statement 302 in a set of one or more statements 302, e.g., p+q. In some examples, an individual tensor corresponding to a statement 302 can include a tensor product of two tensors (e.g., vectors), namely the first-subject representation 306 associated with that statement 302 and the second-subject representation 310 associated with that statement 302 (e.g., f⊗m=fm$^T$ or m⊗g=mg$^T$).

In some examples, at block 916, which can represent blocks 708 or 812, an entity representation 328 can be determined. Entity representation 328 can include an entity tensor 918 having a tensor order less than a tensor order of at least one of the model tensor(s) 914. For example, model tensor(s) 914 can be matrices and entity tensor 918 can be a vector.

In examples using an orthogonal or orthonormal basis, multiplications such as that in Eq. (14) will yield zero matrices for any non-matching queries. Continuing the containment example, add the statement "the garden is in the city." Using d=4, representations 910 of the subjects (c being the city) can be the one-hot unit vectors m, f, g, and c (unity in positions 1 ... 4, respectively). CM 226 w can be as in Eq. (18).

$$w = mg^T + fm^T + gc^T = \begin{bmatrix} 0 & 0 & 1 & 0 \\ 1 & 0 & 0 & 0 \\ 0 & 0 & 0 & 1 \\ 0 & 0 & 0 & 0 \end{bmatrix} \quad (18)$$

The container of the garden can then be determined as in Eq. (19), omitting the outer transpose for brevity. In Eq. (19), model tensor 914 is matrix w and entity tensor 918 is vector g.

$$\begin{aligned} g^T w &= g^T mg^T + g^T fm^T + g^T gc^T \\ &= (g \cdot m)g^T + (g \cdot f)m^T + (g \cdot g)c^T \\ &= 0g^T + 0m^T + c^T \\ &= c^T \end{aligned} \quad (19)$$

That is, in this example, since g⊥m and g⊥f, a single multiply by g$^T$ returns zero for facts not related to g (e.g., that Mary has the football) and a nonzero value for facts related to g (e.g., that the garden is in the city c). When the subject representations 910 are not orthogonal, some noise can be present, e.g., nonzero coefficients on terms g$^T$ and m$^T$ in Eq. (19). The model output can be determined as the subject representation 910 closest to the result of the multiplication in such examples. Noise is discussed below with reference to FIG. 13.

In some examples, queries can be carried out for individual subsets of CM 226. For example, statements 302 mg$^T$, fm$^T$, and gc$^T$ can be represented as separate tensors in CM 226 rather than as sum w (Eq. (18)). Each of those tensors can be left-multiplied by g$^T$ individually to determine results 0, 0, and c$^T$, respectively.

In some examples, at block 920, one or more output representation(s) 922 can be determined by multiplying the entity tensor 918 by individual tensor(s) of the model tensor(s) 914, e.g., using a tensor product ⊗. For example, entity tensor 918 can represent a containee, e.g., Mary in the example of Eq. (14) or the garden in the example of Eq. (19). In examples using only a single model tensor 914, block 920 can include determining a single output representation 922, e.g., g (or, equivalently, $g^T$) in Eq. (14), or c (or $c^T$) in Eq. (19). This permits readily determining, e.g., the container (a second subject of a statement) of a given containee (a first subject of a statement).

In some examples, block 920 can be followed by block 928. For example, the single output representation 922, e.g., g, can be the desired model output. Accordingly, block 928 can provide the single output representation 922, or a selected one of the output representations 922, as the model output 330. In some examples, additionally or alternatively, the model output 330 can be or include text, e.g., "garden." In some examples, accordingly, block 920 can be followed by block 924.

In some examples, at block 924, the output representation(s) 922 can be compared to at least one of the second-subject representations 310 (e.g., of subject representations 910) to determine at least one respective comparison result 926. In the example of Eq. (19), one or more of the comparison results(s) 926 can include representations of the comparisons in Eq. (20).

$$(g^T w)^T \neq m,\ (g^T w)^T \neq f,\ (g^T w)^T \neq g,\ \text{and}\ (g^T w)^T = c. \quad (20)$$

Comparison of tensors can be performed element-by-element. Comparison can determine equality where two elements differ in absolute value by less than a selected tolerance (e.g., zero, epsilon, one least-significant bit, a fixed value such as $10^{-5}$, or other tolerance value). Multiple comparison results 926 can be assembled or packed, e.g., into a vector, bit string, tensor, or other data structure.

In some examples, at block 928, the model output 330 can be determined based at least in part on the comparison result 926. The model output 330 can be determined further based at least in part on at least one of the subject representation(s) 910, at least one of the output representation(s) 922, or at least one of the second-subject representations 310. For example, the model output 330 can be determined to be or correspond to at least one of the output representation(s) 922 for which the respective comparison result 926 indicates a match. Continuing the example of Eq. (20), block 928 can include determining the model output 330 including or corresponding to the tensor c, since c is the only tensor matching $(g^T w)^T$, as indicated by the respective comparison result 926. For example, tensor c can be used to index a lookup table to provide the word "city" as model output 330. Additionally or alternatively, in some examples noted above with reference to block 920, block 928 can include providing an output representation 922 as the model output 330.

Figure 10:
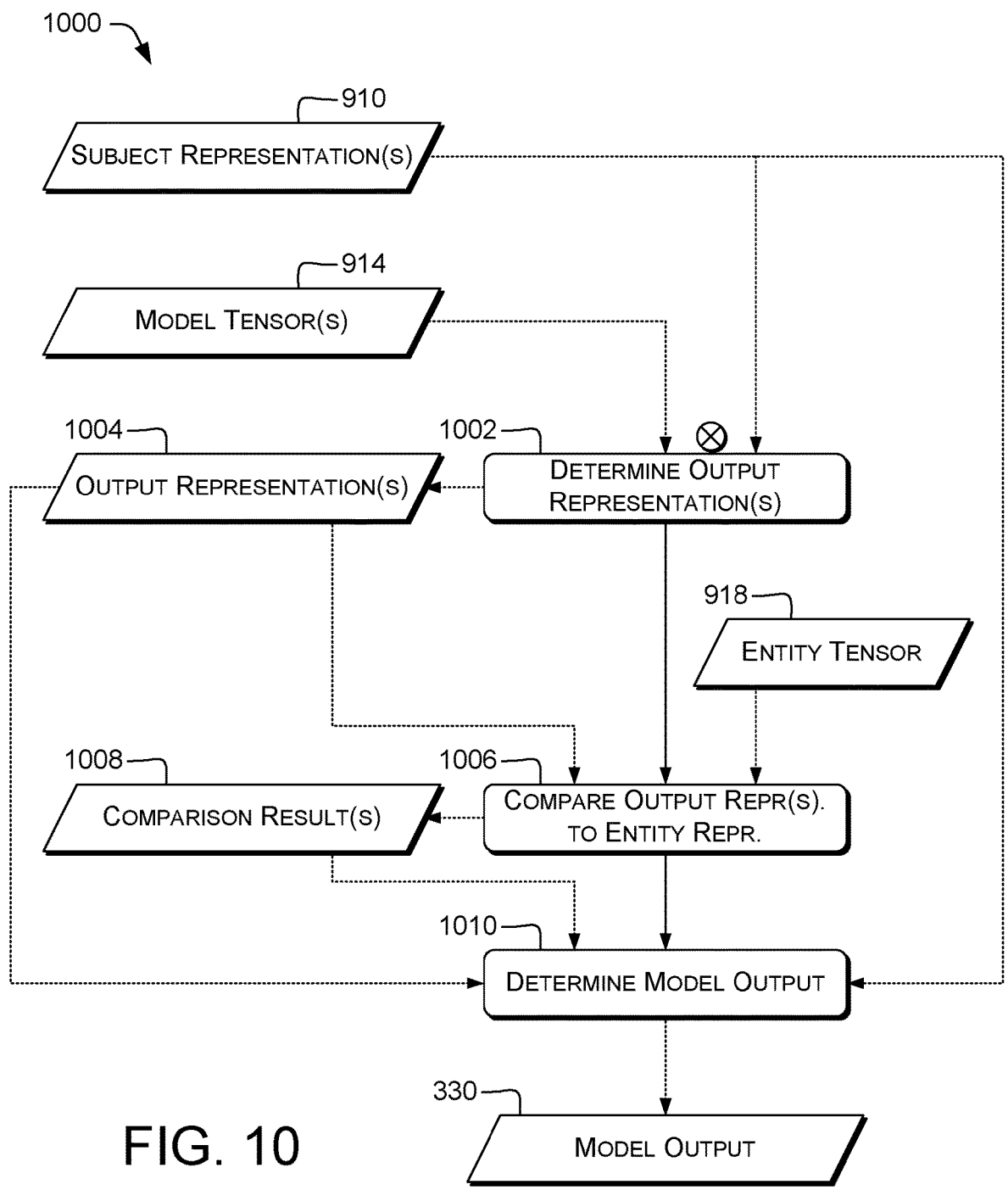
FIG. 10 is a dataflow diagram that illustrates an example process for determining or operating computational model(s), and example data items, according to various examples described herein.

FIG. 10 is a dataflow diagram that illustrates an example process 1000 for determining or operating computational model(s), and example data items. For clarity, process flows are shown using solid or dash-dot lines and data flows are shown using stippled lines. Blocks 706-710 can include one or more blocks of process 1000. In the containment example, blocks 1002, 1006, and 1010 can be used to determine, e.g., subject(s) (containee(s)) contained by a container given in the query 318.

In some examples, at block 1002, one or more output representation(s) 1004 can be determined by multiplying individual representation(s) of the first-subject representations 306, e.g., one(s) of representation(s) 910, by individual tensor(s) of the model tensor(s) 914. In some examples, multiple representations 910 are multiplied separately by a single model tensor 914. In some examples, multiple representations 910 are multiplied by respective ones of the model tensors 914. In the containment example shown in Eq. (18), output representations 1004 $o_x$ can be determined as in Eq. (21).

$$o_m = (m^T w)^T;\ o_f = (f^T w)^T;\ o_g = (g^T w)^T;\ o_c = (c^T w)^T. \quad (21)$$

In some examples, at block 1006, individual ones of the output representation(s) 1004 can be compared to the entity representation 328 from query 318 to determine respective comparison result(s) 1008. In the illustrated example, the entity representation 328 can include the entity tensor 918 from block 916, and block 1006 can include comparing individual ones of the output representation(s) 1004 to the entity tensor 918. Comparison can be performed with a tolerance or in other ways, e.g., as described above with reference to block 924.

In some examples, at block 1010, the model output 330 can be determined based at least in part on at least one of the respective comparison result(s) 1008. In some examples, the model output 330 can be determined further based at least in part on at least one of the subject representation(s) 910 or on at least one of the output representation(s) 1004. For example, the model output 330 can be determined to be or correspond to at least one of the subject representation(s) 910 for which the respective comparison result 926 indicates a match. Continuing the example of Eqs. (18) and (21), query 318 can be, e.g., "What does Mary have?" This query 318 can correspond to an entity tensor 918 of m, as discussed above with reference to Eq. (18). The comparison results 1008 can represent the relationships given in Eq. (22).

$$o_m \neq m;\ o_f = m;\ o_g \neq m;\ o_c \neq m. \quad (22)$$

Based on these comparison results 1008, block 1010 can determine that model output 330 is or corresponds to subject representation 910 f, indicating that Mary has the football. If Mary also had a book with subject representation 910 b, and $o_b$ were equal to m, block 1010 could determine that model output 330 corresponded to the set {f, b}, indicating that Mary had both the football and the book.

In some examples, blocks 412, 920, or 1002 can represent other tensor-product representation (TPR) operations omitted from FIGS. 9 and 10 for the sake of brevity. Without limitation, such operations can include determining at least one tuple associated with a representation, or determining a sum of tuples associated with a representation. In some examples, e.g., as noted above with reference to Eq. (5), an element of a TPR computational model can include terms corresponding to more than two facts, entities, relationships, predicates, or terms of other types described herein. In the example of Eq. (5), the fact that "the bedroom is south of the hallway" can be represented by the tensor product S⊗ b⊗ h, which can alternatively be denoted S(b, h). In some examples, given a tensor-product representation R (x, y) of a predicate R and subjects x and y, any one of R, x, or y can be determined by querying the computational model 226 with the other two of R, x, or y. In some examples, an aggregate result can be determined by querying the computational model 226 with one of R, x, or y.

For example, the tensor product $S^T \otimes (S \otimes b \otimes h)$ can provide b⊗ h, a representation of a relationship between the bedroom b and the hallway h. In a TPR computational model 226 including a sum of multiple terms, e.g., as described above with reference to Eqs. (15) and (18), querying the computational model 226 with one of R, x, or y can provide an aggregate result, e.g., a sum, representing multiple relationships or facts in computational model 226. For example, querying computational model 226 with R can return an aggregate result representing multiple, e.g., all, pairs (x, y)

such that R(x, y) holds. In another example, querying computational model 226 with x can return an aggregate result representing multiple, e.g., all, pairs (R, y) such that R(x, y) holds. Accordingly, in some examples, the query representation 320 can correspond to at least one of an entity (e.g., x) or a relationship (e.g., R) described in the query.

In some examples, a TPR representation such as a vector c, f g, or m, Eqs. (17) or (18), can represent a pair or tuple including or representing a plurality of items. For example, a single one-hot vector or vector member of an orthogonal base can represent a pair such as (x, y). For example, Eq. (5) can be alternatively represented as a tensor product S⊗(b, h), when (b, h) is represented by a single vector or other representation. Accordingly, in some examples, the model output 330 can correspond to an aggregate representation, e.g., (b, h). The aggregate representation can correspond to or otherwise represent two or more facts, entities, relationships, predicates, or terms of other types described herein.

Figure 11:
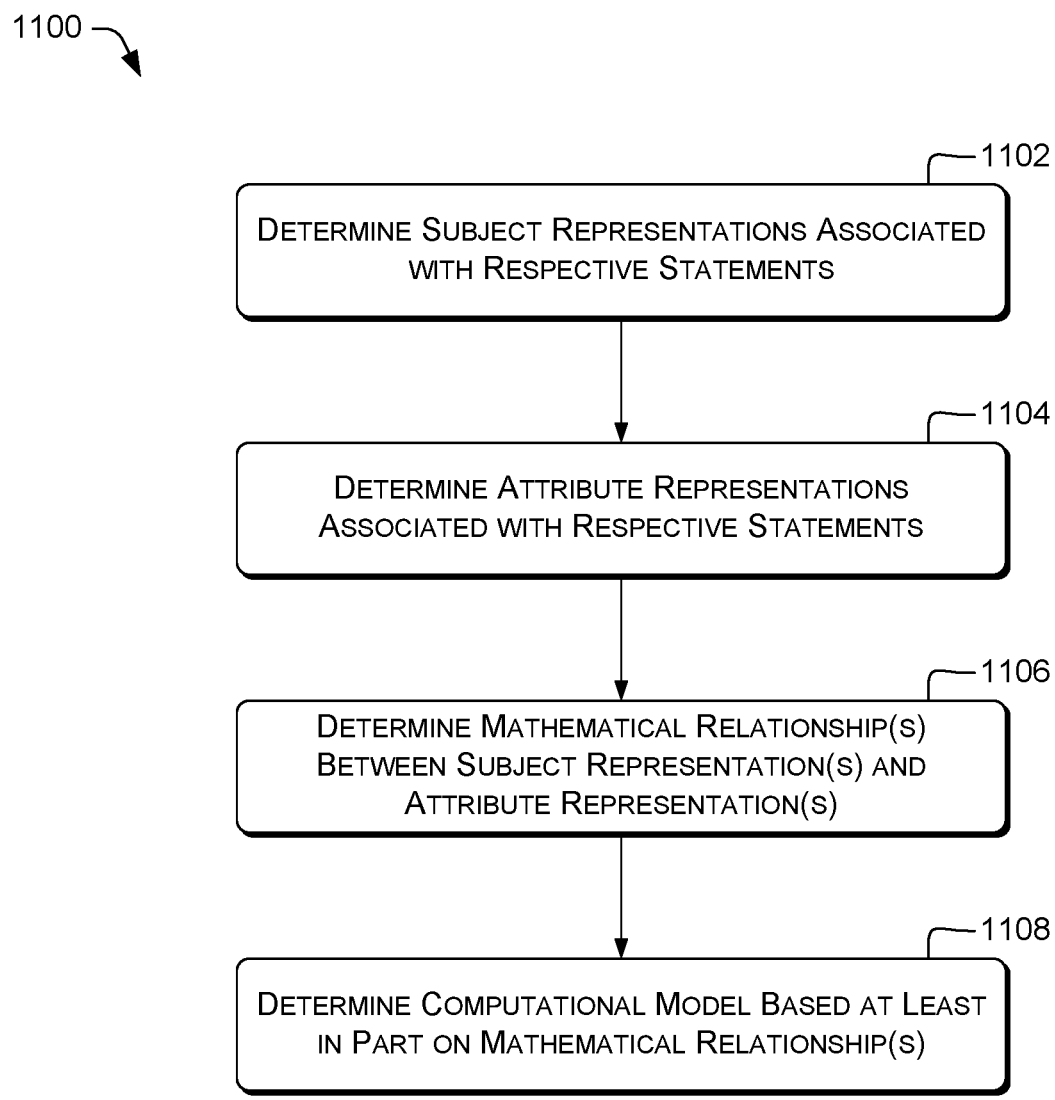
FIG. 11 is a flow diagram that illustrates example processes for determining computational model(s) according to various examples described herein.

FIG. 11 is a flow diagram that illustrates an example process 1100 for determining and operating computational model(s). Some examples of process 1100 can be used, e.g., in representing facts in a knowledge base.

In some examples, at block 1102, respective subject representations 910 can be determined. The subject representations 910 can be associated with respective statements 302 of a plurality of statements. In some examples, at least one of the subject representations 910 does not represent semantics of the respective subject. Semantics are discussed above with reference to FIG. 3.

In some examples, at block 1104, respective attribute representations 314 can be determined. The attribute representations 314 can be associated with respective statements 302 of the plurality of statements. Examples are discussed above, e.g., with reference to blocks 402, 404, 406, 702, or 704. Individual ones of the attribute representations 314 can be or include first-subject representations 306, predicate representations 308, second-subject representations 310, or entity representations 312.

In some examples, individual ones of the attribute representations 314 can represent, e.g., container/containee relationships, relative spatial or geospatial positions, or relationships between entities. Examples are discussed above, e.g., with reference to at least Eqs. (1), (2), (5), (6), (9)-(11), (13), (17), or (26). In some examples, at least one of the attribute representation 314 can include a tensor that is idempotent under multiplication, e.g., as discussed above with reference to block 504 or Eqs. (10) or (11). Some of these examples can be used, e.g., in spatial-relationship determination.

In some examples, at least one of the attribute representations 314 can include a second-subject representation 310 associated with the respective statement 302 of the plurality of statements, e.g., as discussed above with reference to block 406 or Eq. (6). Some of these examples can be used, e.g., in containment determination.

In some examples, at block 1106, at least one mathematical relationship can be determined between individual one(s) of the subject representations 910 and respective one(s) of the attribute representations 314. For example, mathematical relationships can include tensors, products of tensors, graph edges, equations, or other relationships described herein. Examples are discussed above with reference to at least Eqs. (1), (2), (5)-(11), (13), (18), or (23)-(26).

In some examples, at block 1108, a computational model 226 can be determined based at least in part on the at least one mathematical relationship. For example, the computational model can include products of tensors, graphs, or equations or equation systems. Examples are discussed above with reference to at least Eqs. (2), (5), (7), (8), (11), (13), (15), (18), or (23)-(26). In some examples, block 1108 omits, e.g., does not include, performing a clustering operation involving the subject representations 910. Determining CM 226 using techniques described herein, e.g., tensor arithmetic, instead of using clustering or other classification techniques, can reduce the time and memory required to construct or query the knowledge base. For example, tensor-based CMs 226 do not require iterative training before use, unlike neural-network-based classifiers or other classifiers such as support vector machine (SVM) clustering engines.

Figure 12:
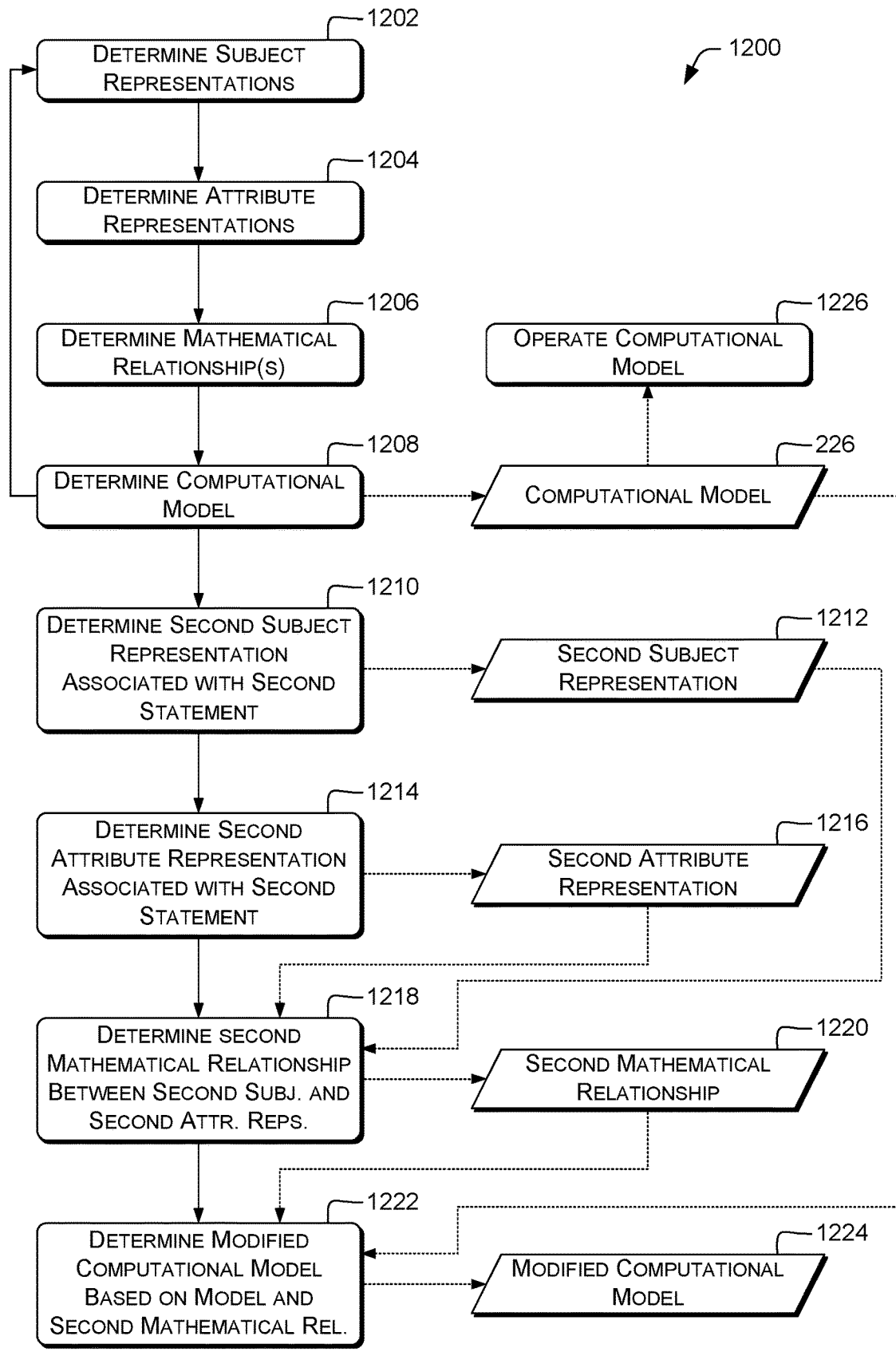
FIG. 12 is a dataflow diagram that illustrates an example process for determining computational model(s), and example data items, according to various examples described herein.

FIG. 12 is a dataflow diagram that illustrates an example process 1200 for determining computational model(s), and example data items. For clarity, process flows are shown using solid or dash-dot lines and data flows are shown using stippled lines. Block 1202 can represent block 1102. Block 1204 can represent block 1104. In some examples, block 1202 or 1204 can include determining a tagged representation of the statement 302 and determining at least one of the respective subject representations or the respective attribute representations based at least in part on the tagged representation. Examples are discussed above, e.g., with reference to the analysis module 232 or block 904. Block 1206 can represent block 1106.

Block 1208 can represent block 1108, and can include determining CM 226. In some examples, block 1208 can be followed by block 1202. This can permit additional statements to be received and incorporated into CM 226, e.g., during a session. Block 1208 can additionally or alternatively be followed by block 1210. In some examples, additionally or alternatively, CM 226 can be provided to block 1226, discussed below.

In some examples, at block 1210, a second subject representation 1212 associated with a second statement 302 can be determined. Examples are discussed above, e.g., with reference to block 406. For example, the second subject representation 1212 can include representation c of the city in Eq. (18).

In some examples, at block 1214, a second attribute representation 1216 associated with the second statement 302 can be determined. Examples are discussed above, e.g., with reference to block 1104. In some examples, at least one of the second subject representation 910 or the second attribute representation 314 comprises random data. Examples are discussed above, e.g., with reference to analysis module 232 or block 502. For example, the second attribute representation 1216 can represent that the city contains the garden ($gc^T$), as discussed above with reference to Eq. (18).

In some examples, at block 1218, a second mathematical relationship 1220 can be determined between the second subject representation 1212 and the second attribute representation 1216. Examples are discussed above, e.g., with reference to block 1106. For example, the second mathematical relationship 1220 can include the tensor product $g \otimes c = gc^T$, as discussed above with reference to Eq. (18).

In some examples, at block 1222, a modified computational model 1224 can be determined based at least in part on the computational model 226 and the second mathematical relationship 1220. For example, the modified computational model 1224 can include one or more equations, graph nodes or edges, or other values from, corresponding to, or based on respective elements of CM 226. The modified computational model 1224 can additionally or alternatively include one or more equations, graph nodes or edges, or other values determined based at least in part on the second mathematical relationship 1220. For example, the modified computational model 1224 can include a tensor sum of a tensor representation of CM 226 and a tensor representation of mathematical relationship 1220. An example is given in Eqs. (23)-(25), continuing the containment example.

$$CM\ 226 = mg^T + fm^T = \begin{bmatrix} 0 & 0 & 1 & 0 \\ 1 & 0 & 0 & 0 \\ 0 & 0 & 0 & 0 \\ 0 & 0 & 0 & 0 \end{bmatrix} \quad (23)$$

$$\text{Relationship } 1220 = gc^T = \begin{bmatrix} 0 & 0 & 0 & 0 \\ 0 & 0 & 0 & 0 \\ 0 & 0 & 0 & 1 \\ 0 & 0 & 0 & 0 \end{bmatrix} \quad (24)$$

$$\text{Model } 1224 = CM\ 226 + \text{Relationship } 1220 = \begin{bmatrix} 0 & 0 & 1 & 0 \\ 1 & 0 & 0 & 0 \\ 0 & 0 & 0 & 1 \\ 0 & 0 & 0 & 0 \end{bmatrix} \quad (25)$$

Some examples of process 1200 permit incrementally updating CM 226 as new statements 302 become available. In an example of Web search, CM 226 can be updated to include new term→document maps from a spider as they become available. In some examples, after the modified computational model 1224 has been determined, CM 226 can be replaced by the modified computational model 1224 for further querying. In some examples, CM 226 can be replaced by the modified computational model 1224 after a selected number of statements 302 have been added to the modified computational model 1224, e.g., 100 statements, 3141 statements, or 10000 statements. In some examples using block 902, if the capacity d is larger than the number of subjects in an initial set of statements 302, the modified computational model 1224 can be updated while maintaining orthogonality of subject representations 910.

In some examples, while determining the modified computational model 1224, the number of subjects referenced in the statements 302 to be represented may exceed the capacity of CM 226. In some such examples, block 1102 or block 1202 may include determining further subject representations 910 close to, but not entirely, orthogonal to existing subject representations 910 in CM 226. As noted above with reference to Eq. (19), queries on the modified computational model 1224 including non-orthogonal subject representations 910 will have some noise, so techniques such as comparisons with tolerance can be used to determine model outputs 330, as described herein.

In some examples, at block 1226, the computational model 226 can be operated based at least in part on a query 318 to provide a model output 330 corresponding to the query 318. Examples are discussed above, e.g., with reference to FIGS. 4-10.

In some examples, block 1226 can include determining at least one query representation 320 based at least in part on the query 318. The at least one query representation 320 can include at least one of a first query-subject representation 322, a second query-subject representation 324, a query-predicate representation 326, or an entity representation 328. Block 1226 can include operating the computational model 226 based at least in part on the at least one query representation 320 to provide the model output 330. Examples are discussed above, e.g., with reference to FIGS. 4-10.

In some examples, block 1226 can include determining a tagged representation 906 of the query 318. Block 1226 can further include determining the at least one query representation 320 based at least in part on the tagged representation 906 of the query 318. Examples are discussed above, e.g., with reference to the analysis module 232, the query-analysis module 236, or block 904.

Figure 13:
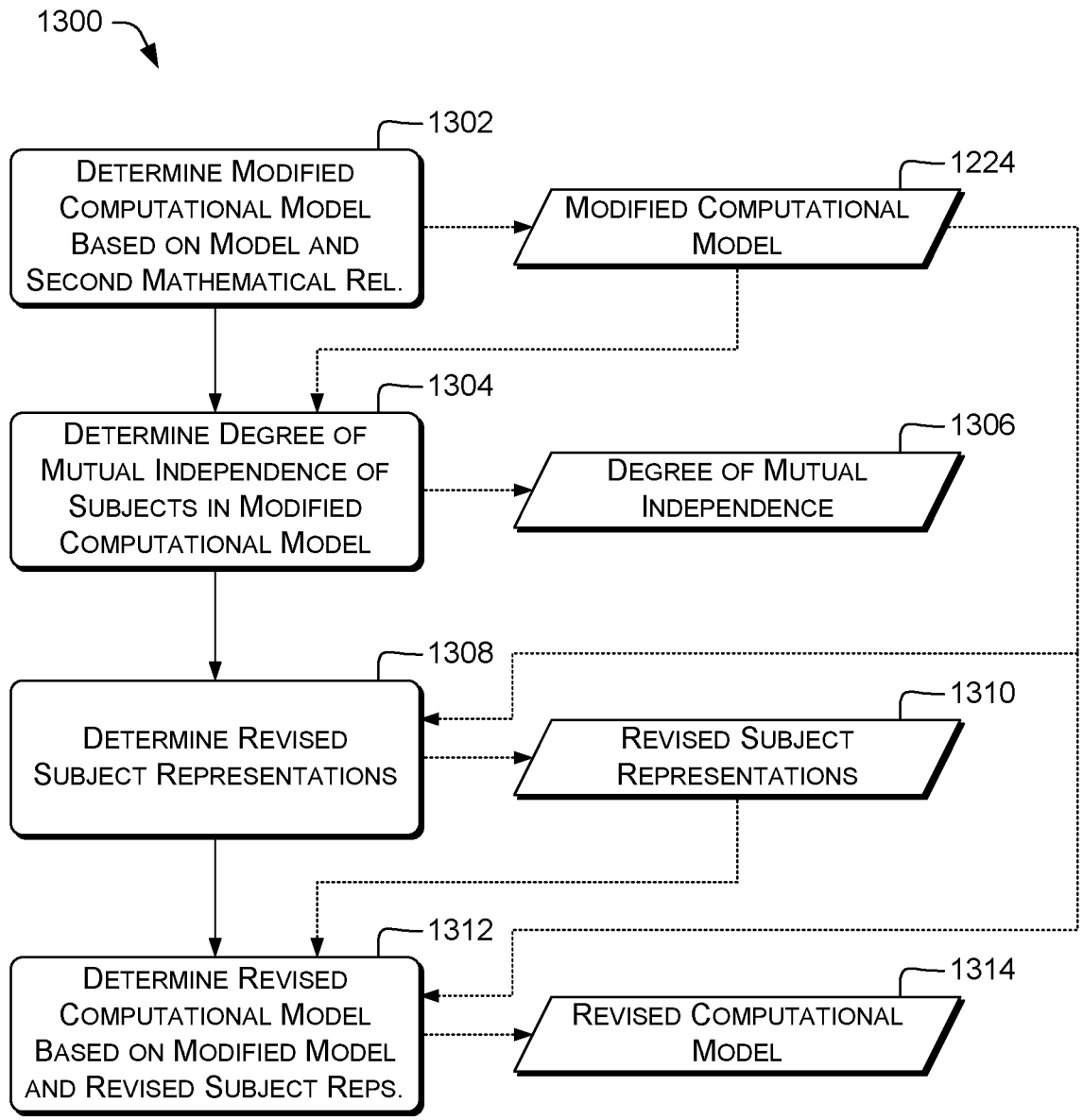
FIG. 13 is a dataflow diagram that illustrates an example process for determining computational model(s), and example data items, according to various examples described herein.

FIG. 13 is a dataflow diagram that illustrates an example process 1300 for determining computational model(s), and example data items. For clarity, process flows are shown using solid or dash-dot lines and data flows are shown using stippled lines. Block 1302 can represent block 1222. In some examples, process 1300 can be used to repack or otherwise adjust a computational model 226 to increase the capacity of that model 226 or to increase the orthogonality of subject representations 910 in that model 226. For example, process 1300 can be used, e.g., after block 1222 (or other block(s) of process 1200, and likewise throughout this discussion) has been used more than once, or after block 1222 has been used more than a selected number of times, or after observed noise exceeds a selected threshold. Observed noise can be determined as, e.g., the magnitude of the nonzero coefficients of $g^T$ and $m^T$ in Eq. (19) when used with subject representations 910 for which at least one representation 910 is not orthogonal to the other representations 910.

In some examples, at block 1304, a first degree of mutual independence 1306 of at least some, or all, representations of a group of representations can be determined. The group of representations can include the respective subject representations 910 and the second subject representation 1212, FIG. 12. In some examples, the group of representations can include at least one, or all, of the subject representations associated with the modified computational model 1224. The first degree of mutual independence 1306 can indicate, e.g., the extent to which the subject representations 910 in the group of subject representations are orthogonal or otherwise independent or substantially independent from each other. In some examples, the first degree of mutual independence 1306 can be determined as the level of observed noise for a single query 318, e.g., a representative query, or the peak level of observed noise over a sequence of queries 318. In some examples, the first degree of mutual independence 1306 can be determined as the peak deviation from perpendicular of any two of the subject representations 910 in the group of subject representations.

In some examples, at block 1308, a plurality of revised subject representations 1310 can be determined based at least in part on the group of representations, e.g., on the subject representations 910 or 1212 thereof. The revised subject representations 1310 can further be determined based at least in part on the first degree of mutual independence 1306. In some examples, the revised subject representations 1310 can have a second degree of mutual independence (omitted for brevity) greater than the first degree of mutual independence 1306. In some examples, block 1308 can include determining a capacity d based at least in part on the group of representations, e.g., as discussed above with reference to block 902. For example, the capacity can be greater than or equal to the number of representations in the group of representations. Block 1308 can then include determining the revised subject representations 1310 as an orthogonal or orthonormal basis (or subset thereof) of a d-dimensional space (or subspace thereof).

In some examples, at block 1312, a revised computational model 1314 can be determined based at least in part on the modified computational model 1224 and the revised subject representations 1310. For example, a plurality of statements 302 can be extracted from modified computational model 1224, e.g., using query processes such as those described above with reference to FIGS. 4-10. The statements can then be re-encoded as functions of the revised subject representations 1310. For example, tensor w of Eq. (18) can be queried with each subject representation 910 in the CM 226 to determine at least one statement 302, e.g., $mg^T$. A corresponding tensor w' can then be computed using revised subject representations 1310 m' and g', e.g., as in Eq. (26).

$$w' = m'(g')^T \quad (26)$$

In some examples, the CM 226 can be replaced by the revised computational model 1314, e.g., as discussed above with reference to the modified computational model 1224.

In some examples, CM 226 can be updated online or offline. For example, processes shown in FIGS. 11-13 can be performed as statements 302 become available to update CM 226 for immediate use. Additionally or alternatively, queries can be performed against a live CM 226 while a shadow CM 226 is updated using such processes. After a specified time has passed or a specified number of statements has been processed, for example, a copy of the shadow CM 226 can be placed into service as the live CM 226 to respond to queries.

Illustrative Results

A system implementing various examples herein was tested on containment, path-finding, and spatial-relationship tasks from the bAbI dataset. The bAbI dataset includes twenty types of tasks, denoted C1-C20. Various prior schemes were also tested. Table 1 shows results from prior schemes. In Table 1, MNN indicates Strongly-Supervised MemNN (memory neural network) trained with clue numbers provided by bAbI, DMN indicates Dynamic MemNN, SSVM indicates Structured SVM with coreference resolution and SRL features, and Multitask indicates multitask training.

TABLE 1

|  | Type | | | | | | | | | |
| --- | --- | --- | --- | --- | --- | --- | --- | --- | --- | --- |
|  | C1 | C2 | C3 | C4 | C5 | C6 | C7 | C8 | C9 | C10 |
| Accuracy | 100% | 100% | 100% | 100% | 99.30% | 100% | 96.90% | 96.50% | 100% | 99% |
| Model | MNN | MNN | MNN | MNN | DMN | MNN | DMN | DMN | DMN | SSVM |

|  | Type | | | | | | | | | |
| --- | --- | --- | --- | --- | --- | --- | --- | --- | --- | --- |
|  | C11 | C12 | C13 | C14 | C15 | C16 | C17 | C18 | C19 | C20 |
| Accuracy | 100% | 100% | 100% | 100% | 100% | 100% | 72% | 95% | 36% | 100% |
| Model | MNN | MNN | MNN | DMN | MNN | MNN | Multitask | MNN | MNN | MNN |

Table 2 shows results from the tested configuration according to various examples herein. Table 2 shows that the tested configuration performed comparably to, or outperformed, the tested prior schemes in each of the twenty types of tasks. The tested configuration significantly outperformed the tested prior schemes in C17, positional reasoning (e.g., above/below/left/right), and C19, path-finding (e.g., north/south/east/west). Table 2 shows results for both development and test sets. The "Development" ("Devel.") data were used to determine the computational model, which was then operated on the "Test" data.

TABLE 2

|  | Type | | | | | | | | | |
| --- | --- | --- | --- | --- | --- | --- | --- | --- | --- | --- |
|  | C1 | C2 | C3 | C4 | C5 | C6 | C7 | C8 | C9 | C10 |
| Devel. | 100% | 100% | 100% | 100% | 99.80% | 100% | 100% | 100% | 100% | 100% |
| Test | 100% | 100% | 100% | 100% | 99.80% | 100% | 100% | 100% | 100% | 100% |

|  | Type | | | | | | | | | |
| --- | --- | --- | --- | --- | --- | --- | --- | --- | --- | --- |
|  | C11 | C12 | C13 | C14 | C15 | C16 | C17 | C18 | C19 | C20 |
| Devel. | 100% | 100% | 100% | 100% | 100% | 99.40% | 100% | 100% | 100% | 100% |
| Test | 100% | 100% | 100% | 100% | 100% | 99.50% | 100% | 100% | 100% | 100% |

Example Clauses

A: An apparatus, comprising: at least one processor; and a computer-readable medium including instructions to, when executed by the at least one processor, cause the at least one processor to: determine a first-subject representation associated with a first subject of a statement; determine a predicate representation associated with a predicate of the statement; determine a second-subject representation associated with a second subject of the statement; determine a computational model of the statement based at least in part on the first-subject representation, the predicate representation, and the second-subject representation; determine, based at least in part on a query, two query representations comprising at least two of a first query-subject representation, a second query-subject representation, and a query-predicate representation; and operate the computational model using the two query representations to provide a model output corresponding to the query, wherein the model output represents a relationship between the two query representations and at least some information in the computational model.

B: An apparatus as recited in paragraph A, further comprising a communications interface, the instructions further to cause the at least one processor to: receive the query via the communications interface; and transmit an indication of the model output via the communications interface.

C: An apparatus as recited in paragraph A or B, the instructions further to cause the at least one processor to determine at least one of the first-subject representation, the predicate representation, or the second-subject representation comprising random data.

D: An apparatus as recited in any of paragraphs A-C, the instructions further to cause the at least one processor to: determine respective first-subject representations associated with respective first subjects of a plurality of statements; determine respective predicate representations associated with respective predicates of the plurality of statements; and determine respective second-subject representations associated with respective second subjects of the plurality of statements; determine the computational model based at least in part on the respective first-subject representations, the respective predicate representations, and the respective second-subject representations.

E: An apparatus as recited in paragraph D, the instructions further to cause the at least one processor to: determine the computational model including a plurality of mathematical relationships, at least one of the plurality of mathematical relationships corresponding to a selected one of the first-subject representations, a selected one of the second-subject representations, and a selected one of the predicate representations.

F: An apparatus as recited in paragraph E, the instructions further to cause the at least one processor to: determine a plurality of candidate representations; determine respective comparison values corresponding to respective ones of the plurality of candidate representations based at least in part on at least one of the plurality of mathematical relationships, the two query representations, or the respective one of the plurality of candidate representations; and determine the model output based at least in part on at least one of the comparison values.

G: An apparatus as recited in paragraph F, the instructions further to cause the at least one processor to: iteratively determine individual ones of the candidate representations and the respective comparison values until one of the respective comparison values indicates that the respective one of the plurality of candidate representations, in association with the two query representations, corresponds to the computational model; and determine the model output comprising the respective one of the plurality of candidate representations.

H: An apparatus as recited in any of paragraphs A-G, the instructions further to cause the at least one processor to determine a tagged representation of the statement; and determine at least one of the first subject representation, the second subject representation, or the predicate representation based at least in part on the tagged representation.

I: An apparatus as recited in any of paragraphs A-H, the instructions further to cause the at least one processor to: determine a tagged representation of the query; and determine at least one of the two query representations based at least in part on the tagged representation.

J: An apparatus as recited in any of paragraphs A-I, the instructions further to cause the at least one processor to determine the computational model not by a mathematical optimization process.

K: An apparatus as recited in any of paragraphs A-J, wherein the model output represents a spatial relationship.

L: An apparatus as recited in any of paragraphs A-K, the instructions further to cause the at least one processor to determine the second-subject representation based at least in part on the first-subject representation and the predicate representation.

M: A system, comprising: a communications interface; at least one processing unit adapted to execute modules; and one or more computer-readable media having thereon a plurality of modules, the plurality of modules comprising: a module of a representation engine that is configured to: determine a first-subject representation associated with a first subject of a statement; determine a second-subject representation associated with a second subject of the statement; and determine a computational model of the statement based at least in part on the first-subject representation and the second-subject representation; a module of a query engine that is configured to: determine an entity representation based at least in part on a query; and operate the computational model using the entity representation to provide a model output corresponding to the query; and a module of a communications engine that is configured to: receive the query via the communications interface; and transmit an indication of the model output via the communications interface.

N: A system as recited in paragraph M, wherein the representation engine is further configured to: determine a tagged representation of the statement; and determine at least one of the first-subject representation or the the second-subject representation based at least in part on the tagged representation.

O: A system as recited in paragraph M or N, the instructions further to cause the at least one processor to determine at least one of the first-subject representation or the second-subject representation comprising random data.

P: A system as recited in any of paragraphs M-O, wherein the representation engine is further configured to: determine respective first-subject representations of respective first subjects of a plurality of statements; determine respective second-subject representations of respective second subjects of the plurality of statements; and determine the computational model based at least in part on the respective first-subject representations and the respective second-subject representations.

Q: A system as recited in paragraph P, wherein: the representation engine is further configured to determine the computational model including model tensor(s) based at least in part on at least one of the first-subject representations and at least one of the second-subject representations; and the query engine is further configured to determine the entity representation including an entity tensor having a tensor order less than a tensor order of at least one of the model tensor(s).

R: A system as recited in paragraph Q, wherein the query engine is further configured to: determine output representation(s) by multiplying the entity tensor by individual tensor(s) of the model tensor(s); compare the output representation(s) to at least one of the second-subject representations to determine a comparison result; and determine the model output based at least in part on the comparison result.

S: A system as recited in paragraph Q or R, wherein the query engine is further configured to: determine output representation(s) by multiplying individual representation(s) of the first-subject representations by individual tensor(s) of the model tensor(s); compare individual ones of the output representation(s) to the entity representation to determine respective comparison result(s); and determine the model output based at least in part on at least one of the respective comparison result(s).

T: A system as recited in any of paragraphs M-S, wherein the model output represents an entity.

U: A system as recited in any of paragraphs M-T, wherein the query engine is further configured to: determine a tagged representation of the query; and determine the entity representation based at least in part on the tagged representation.

V: A system, comprising: a communications interface; at least one processing unit adapted to execute modules; and one or more computer-readable media having thereon a plurality of modules, the plurality of modules comprising: a module of a representation engine that is configured to: determine a first-subject representation associated with a first subject of a statement; determine a second-subject representation associated with a second subject of the statement; and determine a computational model of the statement based at least in part on the first-subject representation and the second-subject representation; a module of a query engine that is configured to: determine a query representation based at least in part on a query; and operate the computational model using the query representation to provide a model output corresponding to the query; and a module of a communications engine that is configured to: receive the query via the communications interface; and transmit an indication of the model output via the communications interface.

W: A system as recited in paragraph V, wherein the query representation corresponds to an entity described in the query.

X: A system as recited in paragraph V or W, wherein the query representation corresponds to a relationship described in the query.

Y: A system as recited in any of paragraphs V-X, wherein the model output corresponds to an aggregate representation.

Z: A system as recited in any of paragraphs V-Y, wherein the representation engine is further configured to: determine a tagged representation of the statement; and determine at least one of the first-subject representation or the the second-subject representation based at least in part on the tagged representation.

AA: A system as recited in any of paragraphs V-Z, the instructions further to cause the at least one processor to determine at least one of the first-subject representation or the second-subject representation comprising random data.

AB: A system as recited in any of paragraphs V-AA, wherein the representation engine is further configured to: determine respective first-subject representations of respective first subjects of a plurality of statements; determine respective second-subject representations of respective second subjects of the plurality of statements; and determine the computational model based at least in part on the respective first-subject representations and the respective second-subject representations.

AC: A system as recited in paragraph AB, wherein: the representation engine is further configured to determine the computational model including model tensor(s) based at least in part on at least one of the first-subject representations and at least one of the second-subject representations; and the query engine is further configured to determine the query representation including a tensor having a tensor order less than a tensor order of at least one of the model tensor(s).

AD: A system as recited in paragraph AC, wherein the query engine is further configured to: determine output representation(s) by multiplying the query tensor by individual tensor(s) of the model tensor(s); compare the output representation(s) to at least one of the second-subject representations to determine a comparison result; and determine the model output based at least in part on the comparison result.

AE: A system as recited in paragraph AC or AD, wherein the query engine is further configured to: determine output representation(s) by multiplying individual representation(s) of the first-subject representations by individual tensor(s) of the model tensor(s); compare individual ones of the output representation(s) to the query representation to determine respective comparison result(s); and determine the model output based at least in part on at least one of the respective comparison result(s).

AF: A system as recited in any of paragraphs V-AE, wherein the model output represents an entity.

AG: A system as recited in any of paragraphs V-AF, wherein the query engine is further configured to: determine a tagged representation of the query; and determine the query representation based at least in part on the tagged representation.

AH: A method, comprising: determining respective subject representations associated with respective statements of a plurality of statements, wherein at least one of the subject representations lacks representation of semantics of the respective statement; determining respective attribute representations associated with the respective statements of the plurality of statements; determining at least one mathematical relationship between individual one(s) of the subject representations and respective one(s) of the attribute representations; and determining a computational model based at least in part on the at least one mathematical relationship.

AI: A method as recited in paragraph AH, further comprising: determining a second subject representation associated with a second statement; determining a second attribute representation associated with the second statement; determining a second mathematical relationship between the second subject representation and the second attribute representation; and determining a modified computational model based at least in part on the computational model and the second mathematical relationship.

AJ: A method as recited in paragraph AI, further comprising: determining a first degree of mutual independence of at least some representations of a group of representations including the respective subject representations and the second subject representation; determining a plurality of revised subject representations based at least in part on the group of representations, wherein the revised subject representations have a second degree of mutual independence greater than the first degree of mutual independence; and determining a revised computational model based at least in part on the modified computational model and the revised subject representations.

AK: A method as recited in any of paragraphs AH-AJ, wherein at least one of the attribute representations comprises a tensor that is idempotent under multiplication.

AL: A method as recited in any of paragraphs AH-AK, wherein at least one of the attribute representations comprises a second-subject representation associated with the respective statement of the plurality of statements.

AM: A method as recited in any of paragraphs AH-AL, wherein the determining the computational model omits performing a clustering operation involving the subject representations.

AN: A method as recited in any of paragraphs AH-AM, wherein at least one of the subject representations or at least one of the attribute representations does not represent semantic information of the statement.

AO: A method as recited in any of paragraphs AH-AN, further comprising determining the computational model not by determining semantic labels based at least in part on the statement.

AP: A method as recited in any of paragraphs AH-AO, further comprising: determining a tagged representation of the statement; and determining at least one of the respective subject representations or the respective attribute representations based at least in part on the tagged representation.

AQ: A method as recited in any of paragraphs AH-AP, further comprising operating the computational model based at least in part on a query to provide a model output corresponding to the query.

AR: A method as recited in paragraph AQ, further comprising: determining at least one query representation based at least in part on the query, the at least one query representation comprising at least one of a first query-subject representation, a second query-subject representation, a query-predicate representation, or an entity representation; and operating the computational model based at least in part on the at least one query representation to provide the model output.

AS: A method as recited in paragraph AR, further comprising: determining a tagged representation of the query; and determining the at least one query representation based at least in part on the tagged representation of the query.

CONCLUSION

Various computational-model determination and operation techniques described herein can permit more efficiently analyzing data, e.g., of a session such as a communication session with an entity, and more readily determining responses to queries from the entity. Various examples can provide more effective ongoing integration of new statements into a computational model, e.g., based on interactions over the course of the session. This can provide improved accuracy of query results compared to prior schemes. Various examples can reduce the time or memory requirements for determining a computational model while maintaining or improving accuracy.

Although the techniques have been described in language specific to structural features and/or methodological acts, it is to be understood that the appended claims are not necessarily limited to the features and/or acts described. Rather, the features and acts are described as example implementations of such techniques. For example, network 108, processing unit(s) 114, and other structures described herein for which multiple types of implementing devices or structures are listed can include any of the listed types, and/or multiples and/or combinations thereof.

The operations of the example processes are illustrated in individual blocks and summarized with reference to those blocks. The processes are illustrated as logical flows of blocks, each block of which can represent one or more operations that can be implemented in hardware, software, and/or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions and/or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, and/or 200 such as one or more internal and/or external CPUs and/or GPUs, and/or one or more pieces of hardware logic such as FPGAs, DSPs, and/or other types described above.

All of the methods and processes described above can be embodied in, and fully automated via, software code modules executed by one or more computers and/or processors. The code modules can be embodied in any type of computer-readable medium. Some and/or all of the methods can be embodied in specialized computer hardware.

Conditional language such as, among others, "can," "could," "might" and/or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" and the phrase "and/or" are used herein in an inclusive sense unless specifically stated otherwise. Accordingly, conjunctive language such as the phrases "X, Y, or Z," "at least X, Y, or Z," or "at least one of X, Y or Z," unless specifically stated otherwise, is to be understood as signifying that an item, term, etc., can be either X, Y, or Z, or a combination thereof.

Any routine descriptions, elements and/or blocks in the flow diagrams described herein and/or depicted in the attached figures should be understood as potentially representing modules, segments, and/or portions of code that include one or more executable instructions for implementing specific logical functions and/or elements in the routine. Alternative implementations are included within the scope of the examples described herein in which elements and/or functions can be deleted and/or executed out of order from any order shown or discussed, including substantially synchronously and/or in reverse order, depending on the functionality involved as would be understood by those skilled in the art. Examples herein are nonlimiting unless expressly stated otherwise, regardless of whether or not they are explicitly described as being nonlimiting. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise.

What is claimed is:
1. An apparatus, comprising:
   at least one processor; and
   a computer-readable medium including instructions to, when executed by the at least one processor, cause the at least one processor to:
   analyze a natural-language statement to determine therein a first subject, a second subject, and a predicate;
   determine a first-subject tensor representation associated with the first subject of the natural-language statement, a predicate tensor representation associated with the predicate of the natural-language statement and a second-subject tensor representation associated with the second subject of the natural-language statement;
   use one or more tensor arithmetic operations to determine a tensor-based computational model of the natural-language statement based at least in part on the first-subject tensor representation, the predicate tensor representation, and the second-subject tensor representation, the model expressing a relationship between the first subject, the second subject, and the predicate;
   determine, based at least in part on a query, at least two query representations comprising at least two of a first query-subject tensor representation, a second query-subject tensor representation, and a query-predicate tensor representation; and operate the tensor-based computational model using the two query representations to provide a model output corresponding to the query, wherein the model output represents a relationship between the two query representations and at least some information in the computational model.

2. An apparatus as recited in claim 1, further comprising a communications interface, the instructions further to cause the at least one processor to:

receive the query via the communications interface; and transmit an indication of the model output via the communications interface.

3. An apparatus as recited in claim 1, wherein at least one of the first-subject tensor representation, the predicate tensor representation, or the second-subject tensor representation comprises random data.

4. An apparatus as recited in claim 1, the instructions further to cause the at least one processor to:

determine respective first-subject tensor representations associated with respective first subjects of a plurality of statements;

determine respective predicate tensor representations associated with respective predicates of the plurality of statements;

determine respective second-subject tensor representations associated with respective second subjects of the plurality of statements; and determine the computational model based at least in part on the respective first-subject tensor representations, the respective predicate tensor representations, and the respective second-subject tensor representations.

5. An apparatus as recited in claim 4, the instructions further to cause the at least one processor to:

determine the computational model including a plurality of mathematical relationships, at least one of the plurality of mathematical relationships corresponding to a selected one of the first-subject tensor representations, a selected one of the second-subject tensor representations, and a selected one of the predicate tensor representations.

6. An apparatus as recited in claim 5, the instructions further to cause the at least one processor to:

determine a plurality of candidate representations;

determine respective comparison values corresponding to respective ones of the plurality of candidate representations based at least in part on at least one of the plurality of mathematical relationships, the two query representations, or the respective one of the plurality of candidate representations; and determine the model output based at least in part on at least one of the comparison values.

7. An apparatus as recited in claim 6, the instructions further to cause the at least one processor to:

iteratively determine individual ones of the candidate representations and the respective comparison values until one of the respective comparison values indicates that the respective one of the plurality of candidate representations, in association with the two query representations, corresponds to the computational model; and determine the model output comprising the respective one of the plurality of candidate representations.

8. A system, comprising:

a communications interface;

at least one processor adapted to execute modules; and one or more computer-readable storage media having thereon a plurality of modules, the plurality of modules comprising:

a module of a representation engine that is configured to:

determine a first-subject tensor representation associated with a first subject of a natural-language statement;

determine a second-subject tensor representation associated with a second subject of the natural-language statement; and use one or more tensor arithmetic operations to determine a tensor-based computational model of the natural-language statement based at least in part on the first-subject tensor representation and the second-subject tensor representation, wherein the first-subject tensor representation and the second-subject tensor representation include at least one of a vector or a matrix, and wherein the tensor-based computational model includes the at least one of a vector or a matrix;

a module of a query engine that is configured to:

determine an entity tensor representation based at least in part on a query; and operate the tensor-based computational model using the entity representation to provide a model output corresponding to the query; and a module of a communications engine that is configured to:

receive the query via the communications interface; and transmit an indication of the model output via the communications interface.

9. A system as recited in claim 8, wherein the representation engine is further configured to:

determine a tagged representation of the statement; and determine at least one of the first-subject tensor representation or the second-subject tensor representation based at least in part on the tagged representation.

10. A system as recited in claim 8, wherein at least one of the first-subject tensor representation or the second-subject representation comprises random data.

11. A system as recited in claim 8, wherein the representation engine is further configured to:

determine respective first-subject tensor representations of respective first subjects of a plurality of statements;

determine respective second-subject tensor representations of respective second subjects of the plurality of statements; and determine the tensor-based computational model based at least in part on the respective first-subject tensor representations and the respective second-subject tensor representations.

12. A system as recited in claim 11, wherein:

the representation engine is further configured to determine the tensor-based computational model including one or more model tensors based at least in part on at least one of the first-subject tensor representations and at least one of the second-subject tensor representations; and the query engine is further configured to determine the entity tensor representation including an entity tensor having a tensor order less than a tensor order of at least one of the one or more model tensors.

13. A system as recited in claim 12, wherein the query engine is further configured to:

determine one or more output representations by multiplying the entity tensor by one or more individual tensors of the one or more model tensors;

compare the one or more output representations to at least one of the second-subject tensor representations to determine a comparison result; and determine the model output based at least in part on the comparison result.

14. A system as recited in claim 12, wherein the query engine is further configured to:

determine one or more output representations by multiplying one or more individual representations of the first-subject tensor representations by one or more individual tensors of the one or more model tensors;

compare one or more individual ones of the one or more output representations to the entity representation to determine one or more respective comparison results; and determine the model output based at least in part on at least one of the one or more respective comparison results.

15. A method, comprising, using one or more processors, performing operations comprising:

determining respective subject tensor representations associated with respective natural-language statements of a plurality of natural-language statements, wherein at least one of the subject tensor representations lacks representation of semantics of the respective natural-language statement;

determining respective attribute tensor representations associated with the respective natural-language statements of the plurality of natural-language statements;

determining at least one mathematical relationship between one or more individual ones of the subject tensor representations and one or more respective ones of the attribute tensor representations;

using one or more tensor arithmetic operations to determine a tensor-based computational model based at least in part on the at least one mathematical relationship;

determining, based at least in part on a query, at least one query representation;

operating the tensor-based computational model based on the at least one query representation to provide a model output, wherein the model output represents a relationship between the at least one query representations and at least some information in the tensor-based computational model, wherein the subject tensor representation and the attribute tensor representation include at least one of a vector or a matrix, and wherein the tensor-based computational model includes the at least one of a vector or a matrix.

16. A method as recited in claim 15, the operations further comprising:

determining a second subject tensor representation associated with a second statement;

determining a second attribute tensor representation associated with the second statement;

determining a second mathematical relationship between the second subject tensor representation and the second attribute tensor representation; and determining a modified tensor-based computational model based at least in part on the tensor-based computational model and the second mathematical relationship.

17. A method as recited in claim 16, the operations further comprising:

determining a first degree of mutual independence of at least some representations of a group of representations including the respective subject tensor representations and the second subject tensor representation;

determining a plurality of revised subject tensor representations based at least in part on the group of representations, wherein the revised subject tensor representations have a second degree of mutual independence greater than the first degree of mutual independence; and determining a revised tensor-based computational model based at least in part on the modified tensor-based computational model and the revised subject tensor representations.

18. A method as recited in claim 15, wherein at least one of the attribute tensor representations comprises a tensor that is idempotent under multiplication.

19. A method as recited in claim 15, wherein at least one of the attribute tensor representations comprises a second-subject tensor representation associated with the respective statement of the plurality of statements.

20. A method as recited in claim 15, wherein the determining the tensor-based computational model omits performing a clustering operation involving the subject representations.

* * * * *